(12) United States Patent
Munne et al.

(10) Patent No.: US 12,145,150 B2
(45) Date of Patent: Nov. 19, 2024

(54) MICROFLUIDIC DEVICES AND METHODS FOR DELIVERING SOLUTIONS TO BIOLOGICAL MATERIAL

(71) Applicant: Overture Life, Inc., New York, NY (US)

(72) Inventors: Santiago Munne, Barcelona (ES); Jose Antonio Horcajadas Almansa, Madrid (ES); Lionel Matthys, Madrid (ES); Joana Alexandra Sales Fidalgo, Madrid (ES); Pablo Carasa Ruiz, Madrid (ES); David Cancio Villalonga, Madrid (ES); Daniel Garcia Alonso, Madrid (ES); Cristina Dosda Munuera, Madrid (ES); Sara Alvarez Arguelles, Madrid (ES)

(73) Assignee: Overture Life, Inc., New York, NY (US)

( * ) Notice: Subject to any disclaimer, the term of this patent is extended or adjusted under 35 U.S.C. 154(b) by 10 days.

(21) Appl. No.: 18/144,834

(22) Filed: May 8, 2023

(65) Prior Publication Data

US 2023/0271182 A1   Aug. 31, 2023

Related U.S. Application Data

(63) Continuation of application No. 17/395,572, filed on Aug. 6, 2021, now Pat. No. 11,660,598.
(Continued)

(51) Int. Cl.
*B01L 3/00*   (2006.01)

(52) U.S. Cl.
CPC ... *B01L 3/502715* (2013.01); *B01L 2200/027* (2013.01); *B01L 2200/0689* (2013.01);
(Continued)

(58) Field of Classification Search
CPC ......... B01L 3/502715; B01L 2200/027; B01L 2300/0681; B01L 2300/1894; B01L 2400/049
See application file for complete search history.

(56) References Cited

U.S. PATENT DOCUMENTS

| 10,136,636 B2 | 11/2018 | Lai et al. |
| 11,660,598 B2 | 5/2023 | Munne et al. |

(Continued)

FOREIGN PATENT DOCUMENTS

| CN | 105831105 A | 8/2016 |
| JP | 2015073468 A | 4/2015 |

(Continued)

OTHER PUBLICATIONS

Abdel Hafez et al., Vitrification in open and closed carriers at different cell stages: assessment of embryo survival, development, DNA integrity and stability during vapor phase storage for transport. BMC Biotechnol. Mar. 30, 2011;11:29. doi: 10.1186/1472-6750-11-29.

(Continued)

*Primary Examiner* — Maris R Kessel
*Assistant Examiner* — Alea N. Martin
(74) *Attorney, Agent, or Firm* — DZ Buschmann Law

(57) ABSTRACT

Disclosed herein are microfluidic devices and methods to deliver concentration gradients to biological material such as oocytes and embryos for the purpose of cryopreparation, cryopreservation, or thawing. Cryopreservation methods, such as vitrification, involve the use of cryoprotectants to reduce formation of damaging ice crystals in cells during freezing. Microfluidic devices and methods described herein improve cell viability and efficiency during handling and cryopreservation of biological materials.

22 Claims, 15 Drawing Sheets

Related U.S. Application Data

(60) Provisional application No. 63/183,359, filed on May 3, 2021, provisional application No. 63/062,610, filed on Aug. 7, 2020.

(52) U.S. Cl.
CPC ..... *B01L 2200/142* (2013.01); *B01L 2200/16* (2013.01); *B01L 2300/0681* (2013.01); *B01L 2300/0867* (2013.01); *B01L 2300/0883* (2013.01); *B01L 2300/14* (2013.01); *B01L 2400/049* (2013.01); *B01L 2400/06* (2013.01)

(56) References Cited

U.S. PATENT DOCUMENTS

| | | |
|---|---|---|
| 2004/0086427 A1 | 5/2004 | Childers et al. |
| 2005/0041525 A1 | 2/2005 | Pugia et al. |
| 2007/0264705 A1 | 11/2007 | Dodgson |
| 2008/0261295 A1 | 10/2008 | Butler et al. |
| 2009/0145485 A1 | 6/2009 | Smith et al. |
| 2012/0251999 A1 | 10/2012 | Demirci et al. |
| 2015/0209782 A1 | 7/2015 | Mostowfi et al. |
| 2018/0016535 A1 | 1/2018 | Levner et al. |
| 2019/0059363 A1 | 2/2019 | Lai et al. |
| 2020/0102528 A1 | 4/2020 | Almansa et al. |

FOREIGN PATENT DOCUMENTS

| | | |
|---|---|---|
| KR | 20100051497 A | 5/2010 |
| WO | 2014106286 A1 | 7/2014 |
| WO | 2015057641 A1 | 4/2015 |
| WO | 2022081966 A1 | 4/2022 |

OTHER PUBLICATIONS

Balaban et al., The Alpha consensus meeting on cryopreservation key performance indicators and benchmarks: proceedings of an expert meeting. Reproductive biomedicine online. (2012) 25: 146-67.

Extended European Search Report dated Feb. 16, 2021 in Application No. 20191848.0.

Heo et al., Controlled loading of cryoprotectants (CPAs) to oocyte with linear and complex CPA profiles on a microfluidic platform. Lab Chip. Oct. 21, 2011 ;11 (20):3530-7.

International Search Report dated Nov. 26, 2021 for PCT/US2021/044940.

Kuleshova et al., Sugars exert a major influence on the vitrification properties of ethylene glycol-based solutions and have low toxicity to embryos and oocytes. Cryobiology. Mar. 1999;38(2):119-30.

Kuwayama et al., Vitrification of bovine blastocysts obtained by in vitro culture of oocytes matured and fertilized in vitro. J Reprod Fertil. Sep. 1992;96(1): 187-93.

Kuwayama, Highly efficient vitrification for cryopreservation of human oocytes and embryos: the Cryotop method. Theriogenology. Jan. 1, 2007 ;67(1):73-80.

Lai et al., Slow and steady cell shrinkage reduces osmotic stress in bovine and murine oocyte and zygote vitrification. Hum Reprod. Jan. 2015;30(1):37-45.

Le Gac et al., Microfluidics for mammalian embryo culture and selection: where do we stand now? Mol Hum Reprod. Apr. 1, 2017 ;23(4):213-226.

Rall et al., Ice-free Cryopreservation of mouse embryos at −196 degrees Celsius by vitrification, Nature vol. 313, Feb. 14, 1985, pp. 573-575.

Smith et al., Prospective randomized comparison of human oocyte cryopreservation with slow-rate freezing or vitrification. Fertil Steril. Nov. 2010;94(6):2088-95.

Song et al., Microfluidics for Cryopreservation. Lab Chip. Jul. 7, 2009; 9(13): 1874-81.

Vajta et al., Are programmable freezers still needed in the embryo laboratory? Review on vitrification. Reprod Biomed Online. Jun. 2006;12(6):779-96.

Zhao et al., Microfluidics for cryopreservation. Biotechnol Adv. Mar.-Apr. 2017;35(2):323-336.

A

B

C

A

B

MICROFLUIDIC DEVICES AND METHODS FOR DELIVERING SOLUTIONS TO BIOLOGICAL MATERIAL

CROSS-REFERENCE

This application is a continuation of U.S. patent application Ser. No. 17/395,572 filed Aug. 6, 2021, which claims the benefit of U.S. Provisional Application No. 63/062,610, filed Aug. 7, 2020, and U.S. Provisional Application No. 63/183,359, filed May 3, 2021, each of which is incorporated herein by reference in its entirety.

BACKGROUND

Cryopreservation is necessary for long-term storage of oocytes or embryos obtained from patients in clinical assisted reproduction laboratories, for later use as part of an assisted reproduction treatment. Cryopreservation methods, such as slow freezing or vitrification, involve the use of cryoprotectants to reduce damage by ice crystal formation in the cytoplasm of oocytes or cells of the developing embryo.

INCORPORATION BY REFERENCE

Each patent, publication, and non-patent literature cited in the application is hereby incorporated by reference in its entirety as if each was incorporated by reference individually.

SUMMARY

In some embodiments, provided herein is a device comprising: a) a microfluidic biochip that comprises: i) a first channel that comprises: —a first channel inlet configured to receive a first solution; and—a first channel outlet connected to a mixing channel and configured to deliver the first solution to the mixing channel; ii) a second channel that comprises: —a second channel inlet configured to receive a second solution; and—a second channel outlet connected to the mixing channel and configured to deliver the second solution to the mixing channel; and iii) the mixing channel that comprises: —a mixing channel inlet configured to receive the first solution and the second solution and mix the first solution with the second solution, thereby providing a mixture of the first solution and the second solution; and—a mixing channel outlet configured to deliver the first solution, the second solution, or the mixture of the first solution and the second solution to a well; and b) the well that comprises: i) a top opening configured to receive a biological material from outside the device and contain the biological material within the bottom of the well; ii) a well inlet connected to the mixing channel outlet and configured to receive the mixture of the first solution and the second solution from the mixing channel outlet, wherein the well inlet is at a bottom end of the well; and iii) a well outlet configured to expel a waste solution from the well, wherein the well outlet is located at a height above the bottom end of the well, wherein the height above the bottom end of the well is greater than a height of the biological material that is received in the well.

In some embodiments, provided herein is a method for delivering a solution to a biological material, the method comprising: a) loading the biological material to the well of the device described herein; b) introducing into the first channel an initial aliquot of the first solution from a first reservoir for an initial time period at an initial pressure level, thereby introducing the first solution to the biological material in the well; c) stopping introduction of the first solution from the first reservoir into the first channel; d) introducing into the second channel an initial aliquot of the second solution from a second reservoir for an initial time period at an initial pressure level, thereby introducing the second solution to the biological material in the well; and e) stopping the introduction of the second solution from the second reservoir into the second channel, thereby delivering the solution to the biological material.

In some embodiments, provided herein is a method for delivering a solution to a biological material, the method comprising: a) loading the biological material to the well of the device of described herein; b) introducing into the first channel an initial aliquot of the first solution from a first reservoir for an initial time period at an initial pressure level, thereby introducing the first solution to the biological material in the well; c) introducing into the second channel an initial aliquot of the second solution from a second reservoir for an initial time period at an initial pressure level, thereby introducing the second solution to the biological material in the well; d) introducing into the first channel a second aliquot of the first solution from the first reservoir for a second time period at a second pressure level, wherein the second aliquot of the first solution is a greater volume than the initial aliquot of the first solution is; and e) introducing into the second channel a second aliquot of the second solution from the second reservoir for a second time period at a second pressure level, wherein the second aliquot of the second solution is a lesser volume than the initial aliquot of the second solution is.

Methods described herein can allow for concentration gradient delivery of one or more solutions to a biological material, e.g., by a gradual increase or a gradual decrease in a volume of one or more solutions delivered to the biological material. For example, these solutions can be a revival solution (RS), a vitrification solution (VS), or a buffer solution (BS).

DETAILED DESCRIPTION

Figure 1:
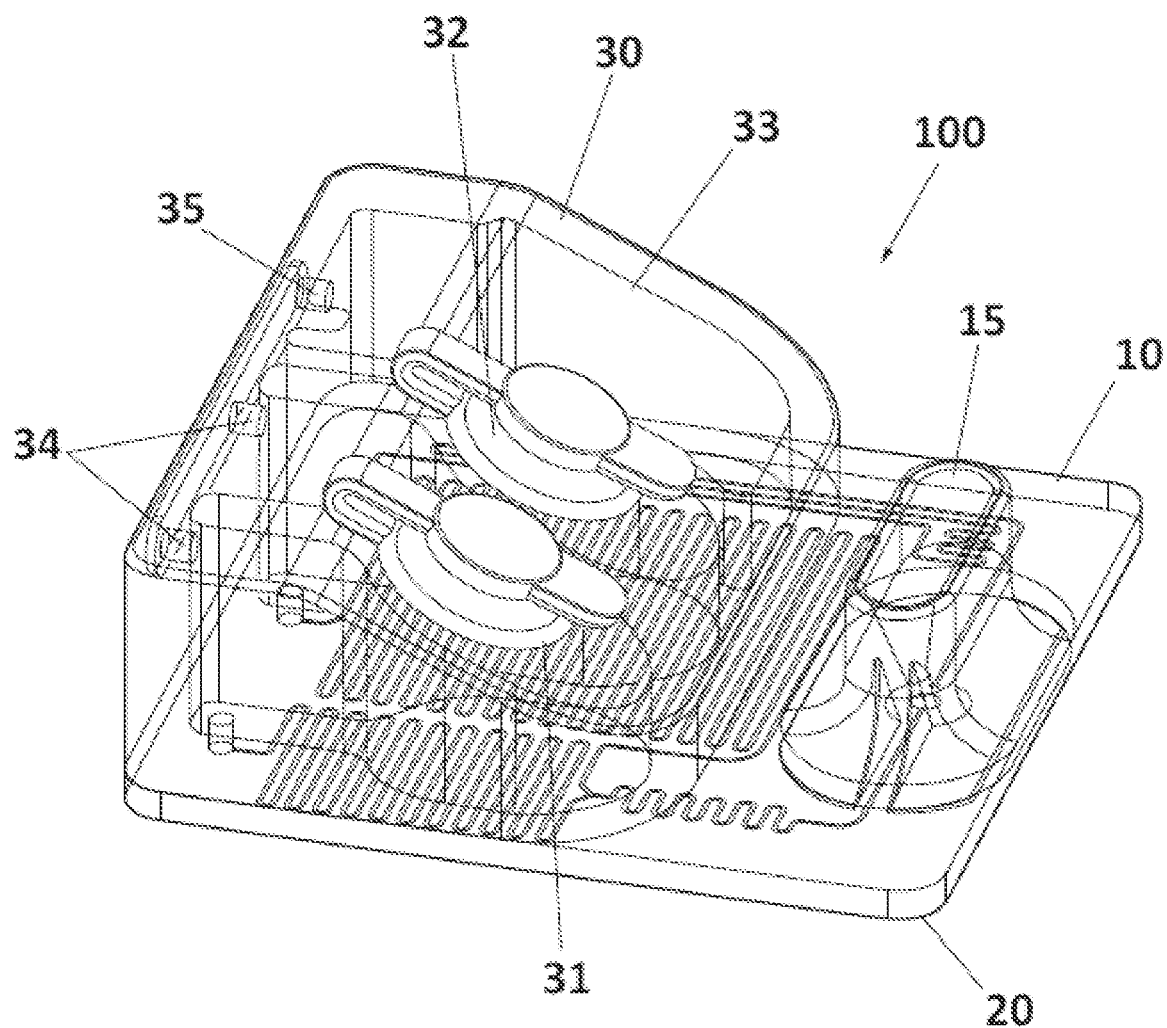
FIG. 1 shows a perspective view of a biochip described herein.

Disclosed herein are microfluidic chips, biochips, devices, and methods for delivering controlled concentrations of cryoprotectants to a biological material, such as oocytes, zygotes, or embryos. Further disclosed herein are biochips, devices for housing the biochips, and methods to deliver, and remove, in an automated way, liquid solutions to and/or from oocytes/embryos, such as cryoprotectant agents (CPAs) and buffers. After the delivery of the liquid solution, the liquid solution can be removed from the biological material, for example, oocytes/embryos, as part of a vitrification and revival/thawing process. This method can result in efficient cryoprocedures and increased viability of cells. Further disclosed herein are microfluidic chips and stations to house the chip to execute a protocol that allows controlled and smooth delivery and removal of solutions containing CPAs, to and from the biological material, for example, cells or cellular complexes such as gametes, oocytes, or embryos. Such protocols can result in high cell survival and development rates. Further, the methods can reduce or eliminate the use of manual methods to deliver CPAs and permit finely controlled delivery of nanoliter or microliter volumes of solution. Finely controlled concentrations of these agents can result in lower osmotic shock and less risk of damage to the cells for higher developmental potential.

The devices and methods described herein can be applicable the field of assisted reproduction in clinical settings, specifically, to process oocytes and embryos for vitrification or cryopreservation purposes, as well as for thawing or revival purposes. Microfluidic technology and applications thereof described herein do not preclude applications to other fields, for example, cryobiology, drug delivery, or chemotherapy.

Cryopreservation

Cryopreservation can be necessary for long-term storage of oocytes or embryos obtained from patients in clinical-assisted reproduction laboratories, for later use as part of an assisted reproduction treatment. Cryopreservation methods, such as slow rate freezing or vitrification, involve the use of cryoprotectants to reduce damaging ice crystal formation in the cytoplasm of oocytes or cells of the developing embryo.

Vitrification can entail several dehydration steps and precise exposure times of the biological material to increase concentrations of cryoprotectant solutions (equilibration steps) followed by fast freezing in liquid nitrogen (LN2). Cryoprotectants can reduce or eliminate formation of damaging ice crystals in the intracellular and surrounding liquid solutions of oocytes or cells of the developing embryo. When frozen, these liquid solutions of oocytes or cells of the developing embryo can be converted into a glass-like amorphous solid that is free of any crystalline structures when plunged in LN2.

Non-limiting examples of CPAs include dimethylsulphoxide (DMSO), 1,2-propanediol (PrOH), acetamide, ethylene glycol, and glycerol), and low-molecular-weight non-penetrating CPAs (such as sucrose or trehalose). Some CPA solutions include high-molecular-weight polymers, such as Ficoll© PM 70.

Many "open" and "closed" carrier devices can be utilized for loading the biological material before storage in LN2. The design of these devices can indirectly affect outcomes due to variations in the cooling and warming rates. The success of a vitrification protocol can depend on two main factors:

of the quality of dehydration when cells are exposed to hypertonic conditions; and the penetration rate of a non-toxic CPA that is sufficient to generate an intracellular environment that can vitrify and remain vitrified for a defined cooling-warming rate.

The addition and removal of CPA from cells can cause successive phases of shrinkage and re-expansion due to movement of water and CPA across the cell membranes that are linked to several biophysical parameters.

Stepwise addition of CPAs during the exposure step can be a standard procedure in vitrification. In some embodiments, gradual or gradient addition of CPA can be preferable. One method involves placing oocytes into small volume drops and then merging the drops with increasing concentrations of CPAs before transferring into LN2.

A common method for oocyte and zygote vitrification involves a 3-step equilibration process in which the cells are manually pipetted into subsequently higher levels of permeable CPA concentrations. This process allows the cells to shrink in stages, and sometimes to re-expand, to avoid the minimum cell volume critical for viability. Exposure to impermeable solutes can be critical for success of vitrification, but impermeable solutes often do not allow for cell re-expansion. For this reason, exposure to impermeable solutes can be reserved until the final step to maintain as large a cell volume as possible.

Compared with murine samples, bovine samples can be more difficult to cryopreserve and are more representative of human in terms of dimensions. For bovine samples, a greater number of equilibration steps increases the rate of cryosurvival and developmental competence. However, despite improved outcomes, protocols with a high number of manual equilibration steps can be impractical. Microfluidic technology can provide a promising solution to this impracticality by automating and standardizing these procedures. Microfluidic devices can facilitate various processes of the cryopreservation process, including facilitating slow-rate freezing, providing precise control of fluid exchange, progressively delivering varying concentrations of CPAs, automating delivery of CPAs to/from cells, automating loading of cells, automating equilibration of cells, automating dehydration of cells, containing cells, immobilizing cells, uniformly exposing cells to CPAs, real-time imaging of cells, and allowing manual retrieval of cells.

Described herein are microfluidic devices that can provide:

Placement or loading of biological material or cells within a microfluidic chamber (microwell) to allow even, uniform exposure of CPAs;

Location or visualization of the cells;

Fully-manual, partly-manual, or fully-automated placement or retrieval of cells;

Fully-automated CPA delivery prior to vitrification of cells;

Revival or warming of cells;

Fully-automated CPA removal after thawing of cells using microfluidic channels; and All previous steps taking place in the same location (microwell), thereby reducing the likelihood of loss of the cells.

In some embodiments, a biochip described herein contains a well system and microfluidic mixing channels for the delivery of cryoprotectant solutions to biological material or cells prior to cryopreservation and removal of cryoprotectant solutions from cells after warming. Further described herein are methods of finely controlled delivery of solutions into the biochip and mixing thereof prior to delivery to the biological material.

Microfluidic Devices and Methods

Described herein are microfluidic biochips for biological material handling. In some embodiments, the biochip contains a first layer having a first microfluidic channel for receiving a first solution, a second microfluidic channel for receiving a second solution, a third microfluidic channel for mixing the first and second solutions, and a fourth microfluidic channel for the extraction of the mixed solution. The first layer can further contain a well having a top opening, a well inlet for receiving the mixed solution from the third channel and a well outlet connected with the fourth channel for removing the waste mixed solution from the well.

In some embodiments, the biochip has a cover bonded to the first layer and having a first reservoir for storing the first solution and connected to the first channel, a second reservoir for storing the second solution and connected to the second channel, and a third reservoir for receiving waste mixed solution and connected to the fourth channel. In some embodiments, the first and second reservoirs are pressurized. When the biochip is sufficiently inserted into a biochip station, the reservoirs of the chips can be sealed and pressurized. A closed system ensures connection between the chip and the station such that pressurized air can enter into the reservoirs without leakage to actuate a flow rate.

In some embodiments, the microfluidic channels are imprinted on the lower surface of the first layer and the lower surface is covered by a second layer. Alternatively, the microfluidic channels can be imprinted on the upper surface of the first layer and can be covered with the cover having the reservoirs. In some embodiments, some channels are on the lower surface and others are on the upper surface of the first layer. In some embodiments, one part of a channel is on the lower surface and other part is on the upper surface.

Each microfluidic channel can have an inlet and an outlet. In some embodiments, a first microfluidic channel has an inlet for the input of a first solution, and an outlet for the output of the first solution. The first inlet can be on the upper surface of the layer. In some embodiments, a second microfluidic channel has an inlet for the input of a second solution, and an outlet for the output of the second solution. The second inlet can be on the upper surface of the layer. In some embodiments, a third microfluidic (mixing) channel for mixing the first and second solutions, also has an inlet and an outlet. The outlets of the first and second channels can converge into the inlet of the third channel. The well inlet can receive the outlet of the third channel and a well outlet can coincide with the inlet of the fourth channel. In some embodiments, a fourth microfluidic (waste) channel for the removal of the mixed solutions also has an inlet and an outlet. The outlet can be on the upper surface of the layer and the inlet can originate from the well. The well for receiving the mixed solution and evenly exposing the biological material to the mixed solution, can be on the upper surface of the first layer.

In some embodiments, the well is located on one side of the first layer. The first and second fluid inlets and the outlet (waste) are located on the opposite side of the first layer such that the channels cross the first layer from one side to the other. Two microfluidic channels can be used for introducing solutions that are to be mixed in a third channel before entering the well. Another channel can be used for removing the waste solution from the well.

Figure 5:
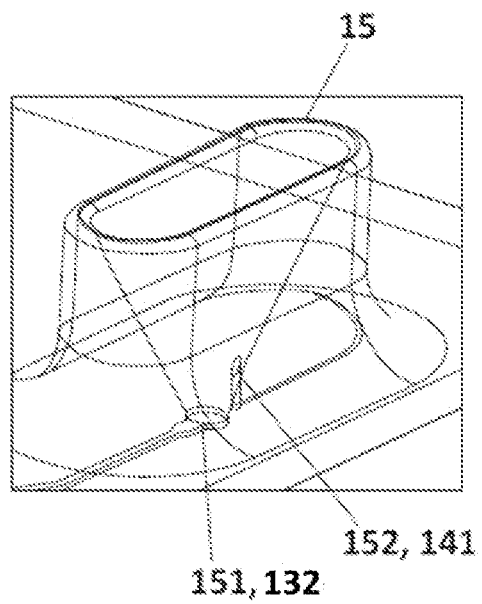
FIG. 5 shows perspective views of a well of a biochip described herein. Panel A shows a perspective view of a detail of the well on the upper layer. Panel B shows a front view of a well. Panel C shows a side view of a well in the biochip. Panel D shows an upper view of the inside of a well where the outlet has a filter or mesh. Panel E shows an upper view of the inside of a well where the outlet of the well is a groove.
Figure 5:
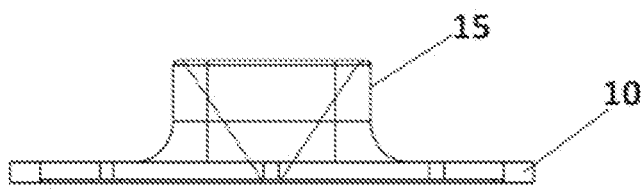
Figure 5:
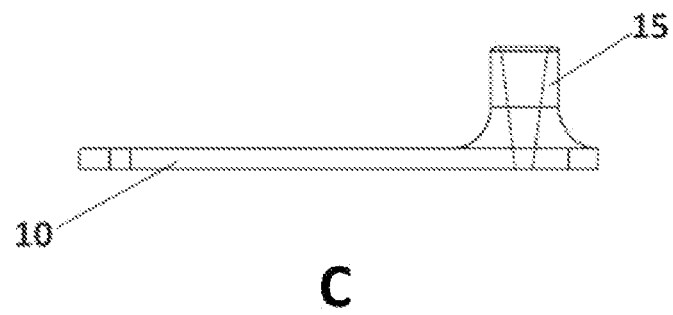
Figure 5:
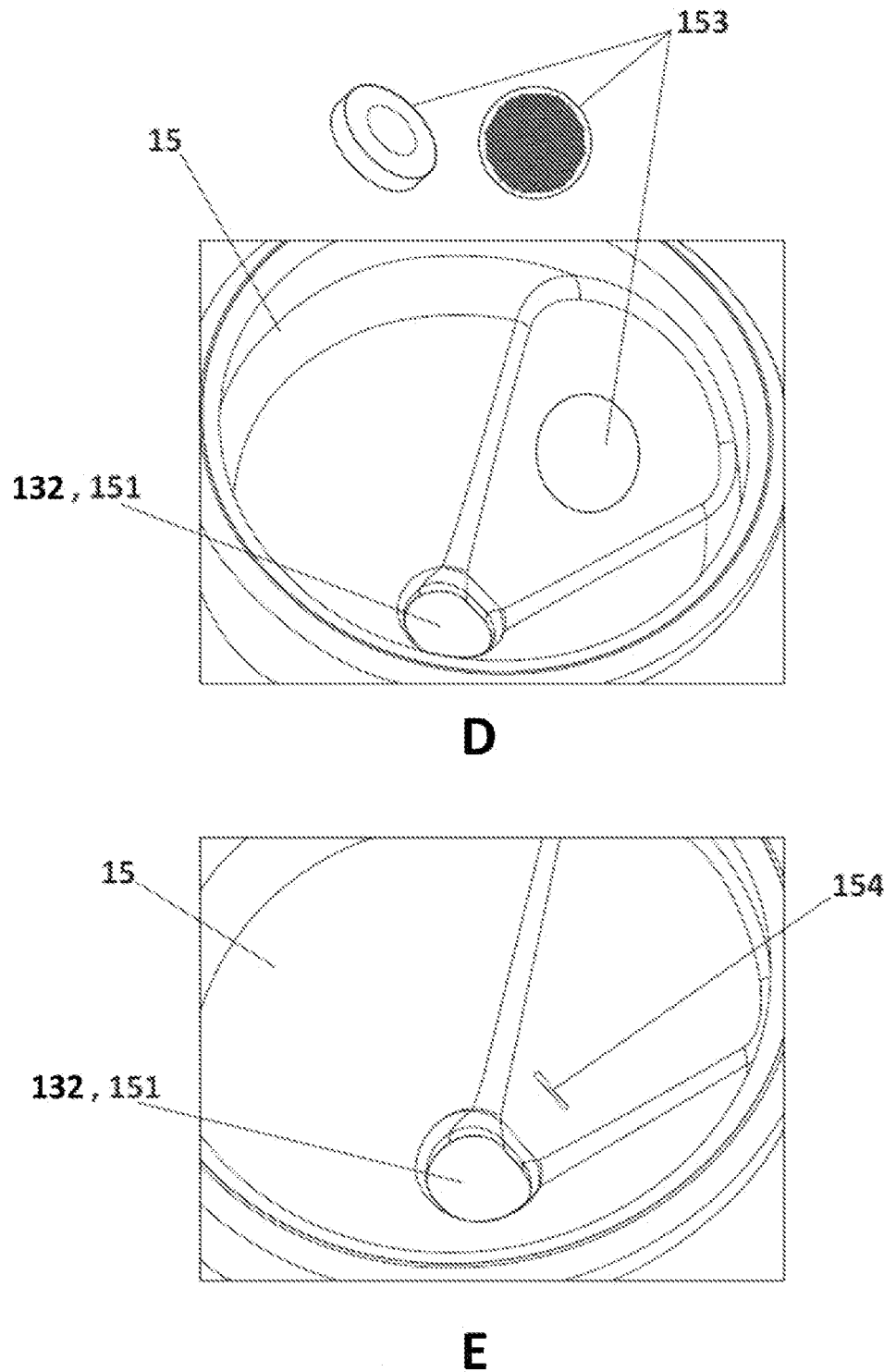

In some embodiments, the bottom of the well has an inlet and an outlet. In some embodiments, the inlet connects to the third microfluidic channel and introduces the mixed solutions from the first and second reservoirs inside the well. In some embodiments, the outlet connects the well to the fourth channel that directs the solution contained in the well to the waste or third reservoir. In some embodiments, the inlet is located at the bottom of the well. The outlet can be either at the bottom of the well, at the same level as the inlet, or above the inlet. In some embodiments, the well outlet is elevated (e.g., by approximately 1 mm) to prevent the bottom of the well from drying and consequential sample loss/cell death. Additionally, the outlet can have a mesh or filter to prevent the escape of the cells through the outlet during efflux of a solution from the outlet. In some embodiments, the outlet contains a groove having a longitudinal width (e.g., <100 µm) that is smaller than the length (e.g., >150 µm) to prevent the escape of the cells from the well during efflux of a solution, thereby containing the cells within the well (FIG. 5, Panels D and E). In some embodiments, the well inlet and outlet dimensions can be smaller than the diameter of a cell sample to prevent cells from entering the microfluidic channels. For example, the dimension can be less than about 100-115 µm, or an approximate minimum size of a mature human oocyte.

In some embodiments, the well is used for containing cells and is accessible to a user from the upper side. In some embodiments, the well is accessible to a robotic arm that deposits or removes biological sample, for example, using an automated or robotized pipette or cryostorage device. The shape of the well can allow an easy access point from the upper side to the inside of the well for depositing a sample into the well or retrieving a sample from the well. The shape can also allow containment of cells within the bottom of the well. The well can have any shape suitable for containment of biological material, cells, solution, and/or media, e.g., conical or cylindrical.

In some embodiments, the first and second microfluidic channels merge in a third microfluidic channel, i.e., a mixing channel, where the solutions are mixed before reaching the well. In some embodiments, a fourth channel extracts the waste solution from the well and the biochip.

The shape, dimensions, length, and cross-sections of the channels can be designed according to the characteristics of the solutions to be introduced into the channels. For example, the channels can be designed to impart specific and defined hydrodynamic resistances based on the viscosity of the solutions that flow through the channels. Flow rates of the solutions through the channels can be varied based on pressure control at a fixed hydrodynamic resistance for a given fluid.

In some embodiments, a serpentine-shaped path can achieve a desirable hydrodynamic resistance and optimize the space on a small dimension chip. A serpentine-shaped path (e.g., in the third channel) can also allow for thorough mixing of the two solutions from the first and second channels. This third channel therefore can serve to combine two different solutions to achieve gradually increasing or decreasing concentrations of one solution reaching the well.

In some embodiments, the first and second reservoirs are pressurized by a pressure pumping system. The pressure system can be two independent pressure pumps, one for each reservoir, or a single pressure pump for both reservoirs. For example, a first pressure pump can be connected to the first reservoir, and a second pressure pump can be connected to the second reservoir. Alternatively, a single pressure pump can be associated with an electro-mechanic valve that sequentially delivers pressure to the reservoirs. The pressure pumping system can direct pressurized air into the first reservoir (and subsequently the first channel) and/or the second reservoir (and subsequently the second channel). In this way, the pressure pumping system can actuate delivery of solutions from the reservoirs to the microfluidic channels of the biochip. In some embodiments, the third reservoir is coupled to a vacuum pressure pump. In some embodiments, each reservoir contains a pressure entrance that couples to pressure nozzles connected to a pressure pumping system using, for example, flexible tubing or a pneumatic manifold.

In some embodiments, the reservoirs in the cover that are bonded to the upper surface are connected to the microfluidic channels. In some embodiments, the first reservoir is connected to the inlet of the first channel, the second reservoir is connected to the inlet of the second channel, and the third reservoir is connected to the outlet of the fourth channel. The first and second reservoirs can be used for storing the solutions to be mixed. The third reservoir can be used for the solution removed from the well after the previous solutions have been mixed and in contact with the biological material. The reservoirs can store larger volumes of fluids or solutions such as vitrification and thawing/revival solutions (containing a maximal amount of cryoprotectant agents) or buffer solutions (containing no cryoprotectant agents) to deliver and remove CPAs during the cell cryopreparation or revival procedure in the biochip.

The solutions in the first and second reservoirs can contain a CPA, a mix of CPAs, or a buffered solution, for example, a buffered saline solution. Non-limiting examples of buffered solutions include phosphate buffered saline (PBS), HEPES, bicarbonate pH buffer, cell media, for example, embryo culture media, and embryo/blastocyst culture media. Non-limiting examples of cryoprotectants include dimethyl sulfoxide (DMSO), glycerol, acetamide, 1,2-propanediol (propylene glycol, PG), sucrose, polyethylene glycol (PEG), trehalose, and ethylene glycol (EG). In some embodiments, vitrification solution can contain ethylene glycol, dimethyl sulfoxide, and/or trehalose.

In some embodiments, the solutions are supplemented with one or more components including, but not limited to, physiological salts, energy substrates, pH buffer, essential and non-essential amino acids, antibiotics (e.g., penicillin, streptomycin, or gentamicin), serum, proteins, lipids, formamide, methoxylated compounds, polymers (e.g., polyvinyl pyrrolidone and polyvinyl alcohol), hyaluronan, cryoprotectants, and/or sugars.

In some embodiments, the biochip is used for the manipulation of biological samples, for example, from the single cell (oocyte) stage to the blastocyst embryo stage. Non-limiting examples of cells that can be manipulated by devices disclosed herein include single cells, such as ova and oocytes; masses of pluralities of cells, such as cumulus oocyte complexes, zygotes, embryos, blastocysts, ovarian tissue, cancer biopsies, and other pluralities of cells.

Further described herein is a station for housing a microfluidic biochip, such as the biochips described herein. The station can be configured to control the flow and temperature of the solutions in the biochip. In some embodiments, the station contains a body with a housing for receiving a biochip, at least one positive pressure pumping system with a connection to the first and second reservoirs in the biochip, at least one vacuum pressure pumping system with a connection to the third reservoir in the biochip, and a control unit.

In some embodiments, the housing allows the introduction of the biochip. For example, the biochip can be inserted into the housing station with the reservoirs side first, leaving the well side outside of the housing such that the top open end of the well is exposed and accessible to a user. In some embodiments, the station does not come into contact with any liquid, sample, or other contaminants. In this manner, the station can be reusable with a plurality of biochips. In some embodiments, biochips described herein are reusable. In some embodiments, biochips described herein are disposable.

In some embodiments, the station can contain at least one positive pressure pumping system used to pressurize the first and second reservoirs, and one vacuum pressure pumping system connected to the third reservoir to generate a vacuum for removing waste medium from the well. This pressure system can contain an electro-mechanic valve located between the positive pump and the first and second reservoirs. The valve can switch between pressurization of the first reservoir and the second reservoir. This valve can have two positions such that the pressurized air is driven towards either the first or the second reservoir (i.e., both reservoirs are not pressurized simultaneously). This sequential pressurization system can include a calibrated vent or calibrated leak in each tube that connects the valve with each of the reservoirs to allow the pressurized air to escape after each change of position of the valve.

In some embodiments, the station contains two independent positive pressure pumps, one connected to the first reservoir and the other connected to the second reservoir. Both pumps can be synchronized to provide a sequential injection of each solution from each of the two reservoirs. This two-pump system allows for a smooth, gradual increase in pressure over time in the first reservoir and a smooth, gradual decrease in pressure over time in the second reservoir, thereby resulting in a smooth concentration gradient delivery.

In some embodiments, the vacuum pump is directly connected to the third reservoir.

In some embodiments, the station includes a user interface, for example, a touch screen, for controlling the station. The user interface can provide the user with direct control over actions of the station, such as launch protocols and stop protocols. The user interface can also advise the user when to load and/or remove the sample. The user interface can indicate parameters, such as time, temperature, and station status. The user interface can also be used for registering patient related or sample related information. The user can choose, for example, between one of four modes or protocols: a protocol for cryopreserving oocytes, a protocol for cryopreserving embryos, a protocol for thawing oocytes, and a protocol for thawing embryos.

Depending on the structure of the biochip and the housing station, the reservoirs can be accessible from outside the housing or remain inside the device without access from outside the housing. Depending on disposition of the reservoirs, the reservoirs can be filled with the solutions before or after introducing the biochip in the housing of the station. The reservoirs can have structures to prevent evaporation of the solutions and to seal the reservoirs for pressurization, for example, these structures can be enclosed by a sealed cap for closing a filling access of the reservoirs or any other device that prevents the evaporation of the solutions and sealing for pressurization of the reservoirs. Alternatively, the biochip can include the solutions already pre-loaded in the reservoirs without any caps for accessing the reservoir.

The station can also have a heating element to allow heating of the station and/or the biochip therein if desired. The heating element can be in the housing of the station under the biochip or can be around the well such as a heated coil, a heated crown, or heated glass.

The station can also include an electrical power supply for feeding electrical devices, such as the pumping systems and the heating element, and a processor for controlling the operation of the different components in the station.

Further described herein is a method for delivering a liquid solution to a biological material, for example, for cryopreparation or thawing of cells, such as oocytes and embryos. Prior to the cryopreservation and cryostorage of these valuable cells, these cells can be prepared in cryopreparation protocols described herein to achieve high cryo-survival rates.

A thawing protocol can be utilized after embryos or oocytes have been in long-term LN2 storage and are needed as part of an assisted reproduction treatment cycle. These cryopreserved biological samples can be revived prior to use with a first step using a solution heated to approximately body temperature or a temperature suitable for the desired protocol.

Non-limiting examples of methods of delivering a liquid solution to a biological material can include the following steps:
a) Introducing into a first microfluidic channel of a biochip a first solution from a first reservoir for at least a first determined period of time;
b) Stopping the introduction of the first solution into the first microfluidic channel;
c) Introducing into a second microfluidic channel a second solution from a second reservoir for at least a second determined period of time;
d) Stopping the introduction of the second solution into the second microfluidic channel;
e) Repeating steps a) to d), for example, several times; and
f) Placing or loading the biological material into the well.

Non-limiting examples of methods of delivering a liquid solution to a biological material can include the following steps:
a) Introducing into a first microfluidic channel of a biochip a first solution from a first reservoir for at least a first determined period of time;
b) Introducing into a second microfluidic channel a second solution from a second reservoir for at least a second determined period of time; and
c) Placing or loading the biological material into the well.

These methods can include actuation of a positive pressure system, for example, a positive pressure system connected to both first and second reservoirs through a connection. The connection can be, for example, an electromechanical valve (e.g., a 3-way, 2-position valve) placed in the station or a T-connector with the pump at one end of the T and two independent valves at the other ends of the T.

In some embodiments, one valve is connected to the reservoirs through a first pressure tube for connecting the valve to the reservoir with a vitrification or revival/thawing solution, and through a second pressure tube for connecting the valve to the reservoir with a buffer solution. The valve can have one inlet position and two outlet positions. The valve can be used to switch the pneumatic pathway from the inlet to one of the two outlets. The inlet can be connected to the positive pumping system. Each outlet can be connected to one of the pressure tubes leading to the first and second reservoirs. The valve can change the direction of the pressurized air coming from the pumping systems and can direct the pressurized air to one of the two reservoirs alternately, thereby injecting air in one of the two reservoirs at a time for a specific period of time.

The first solution, for example, a vitrification solution, from the first reservoir can be introduced in the first channel for at least a first determined period of time. Once the period ends, the valve can change position, thereby stopping the introduction of the first solution into the first channel and allowing introduction of the second solution into the second channel. The second solution, for example, a buffer solution, can then be introduced into the second channel for at least a second determined period of time. In some embodiments, the second period of time is the same length as the first period of time. In some embodiments, the second period of time is not the same length as the first period of time. Once the second period of time ends, the valve can change position again, thereby stopping the introduction of the buffer solution into the second channel. The previous steps can then start again, repeating the sequence for a different, or the same, periods of time depending on the protocol. The method can be terminated when the well is filled with a desired concentration of a particular solution after mixing of the two solutions in the third microfluidic channel for a period of time.

In some embodiments, the method entails introduction of the same solution in two consecutive steps in the channel with a small pause between both steps. In this case, the position of the valve does not change between one step and the subsequent step, thereby allowing pressurization of only one solution, for example, the first solution. The pump can be switched off to pause the injection of solution into the chip. To continue the injection of solution, the pump can be switched on again.

Prior to the use of the chip, priming of the microchannels can be executed. For a cryopreparation protocol, a vitrification solution (VS), stored in the first reservoir, can be injected into the first microchannel only until the VS reaches the third (mixing) microchannel. Then, a buffer solution (BS), stored in the second reservoir, can be introduced into the second microchannel until the BS reaches and fills the mixing channel, and subsequently the well. After the priming is complete and the sample can be loaded in the well, and the cryopreparation protocol can begin. This protocol can require the gradual increase in volume of the VS which can be slowly introduced to gradually predominate over the BS in the mixing channel, resulting in increasing concentration of CPAs reaching the well until the well contains only VS and no BS (i.e., about 100% VS and about 0% BS). The VS and the BS can be alternately injected on a step-by-step basis to achieve a gradual increase in concentration of the VS.

For a revival, thawing, or warming protocol, priming of the chip can slightly differ. A BS from the second reservoir can be introduced inside the second channel only until reaching the third channel and a revival solution (RS; containing maximal amounts of CPA) can be introduced from the first reservoir into the first channel until the RS reaches and fills the mixing microchannel, and subsequently, the well. After the priming is complete, the revival protocol can commence. The revival protocol can proceed in the reverse order of the cryopreparation protocol. The revival protocol can involve increasing the volume of BS by slowly introducing the BS in the chip through the second microchannel to gradually increase the amount of buffer solution in the mixing channel to predominate over the RS in the mixing channel. This process can result in a stepwise decrease in the concentration of RS (containing maximal amount of CPAs) in the well until the well contains only BS and no RS (i.e., about 100% BS and about 0% VS).

Biological Materials

Devices and methods described herein can be used with any biological material, for example, cells, such as oocytes, zygotes, or embryos. In some embodiments, the biological material is human cells, such as human oocytes, zygotes, or embryos. Non-limiting examples of biological material include stem cells, tissue cells, bovine cells, murine cells, leporine cells, equine cells, swine cells, porcine cells, canine cells, and feline cells.

EXAMPLES

Example 1. A Microfluidic Device Described Herein and Uses Thereof

FIG. 1 shows a biochip 100 described herein having a first layer 10 with an imprinted circuit of microchannels on the lower surface of the layer 10, which is covered by a second layer 20, and a well 15 on one end of the first layer 10. On the other end of the first layer 10, the biochip 100 has a cover 30 bonded to the upper surface of the first layer 10. The cover 30 includes three reservoirs for storing liquid solutions: a first reservoir 31 for containing a first solution to be introduced into the circuit; a second reservoir 32 for containing a second solution to be introduced into the circuit; and a third reservoir 33 for containing the waste solution when extracted from the circuit. The reservoirs 31, 32, and 33 contain pressure inlets to force the content of the reservoirs into the circuit or to extract the content of the circuit. Specifically, the chip has two positive pressure inlets 34 on the first 31 and second 32 reservoirs and a vacuum pressure inlet 35 on the third reservoir. The first 31 and second 32 reservoirs each has an opening, with a cap, for introducing the solutions from the reservoirs. The caps can provide an airtight seal for containing the content inside the reservoirs. In some embodiments, the third reservoir 33 is closed at the upper end and does not have an access point from above.

Figure 2:
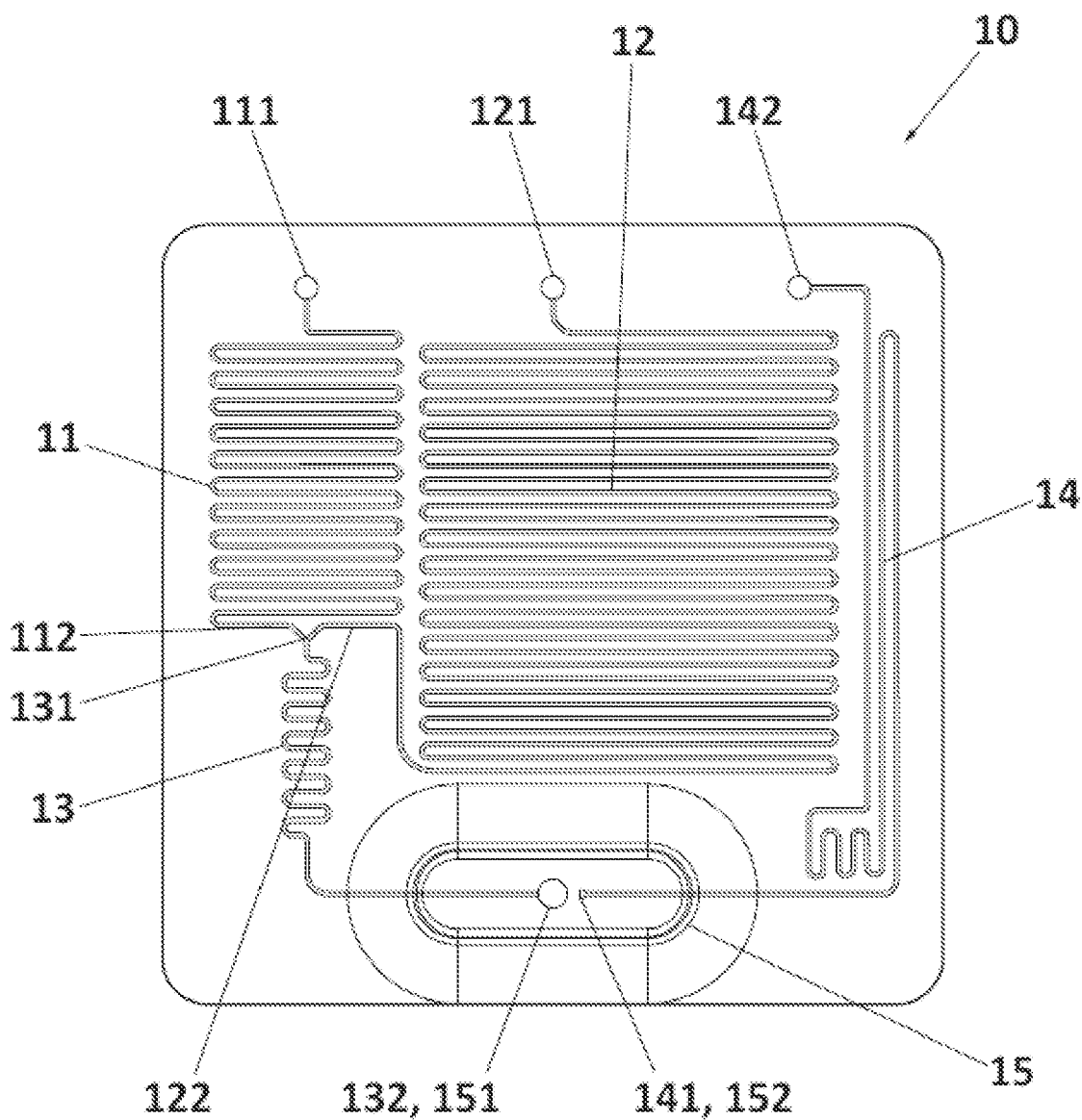
FIG. 2 shows a top view of the biochip of FIG. 1.

The circuit in a microfluidic biochip is shown in FIG. 2. The same shows a top view of a first layer 10. Specifically, the circuit has a first microfluidic channel 11 for the introduction of a first solution into the circuit, a second microfluidic channel 12 for the introduction of a second solution into the circuit, a third microfluidic channel 13 for mixing the first and second solutions, and a fourth microfluidic channel 14 for the extraction of the mixed solutions from the circuit. The first microchannel has an inlet 111, the second channel has inlet 121 and the fourth microfluidic channel has an outlet 142.

Figure 3:
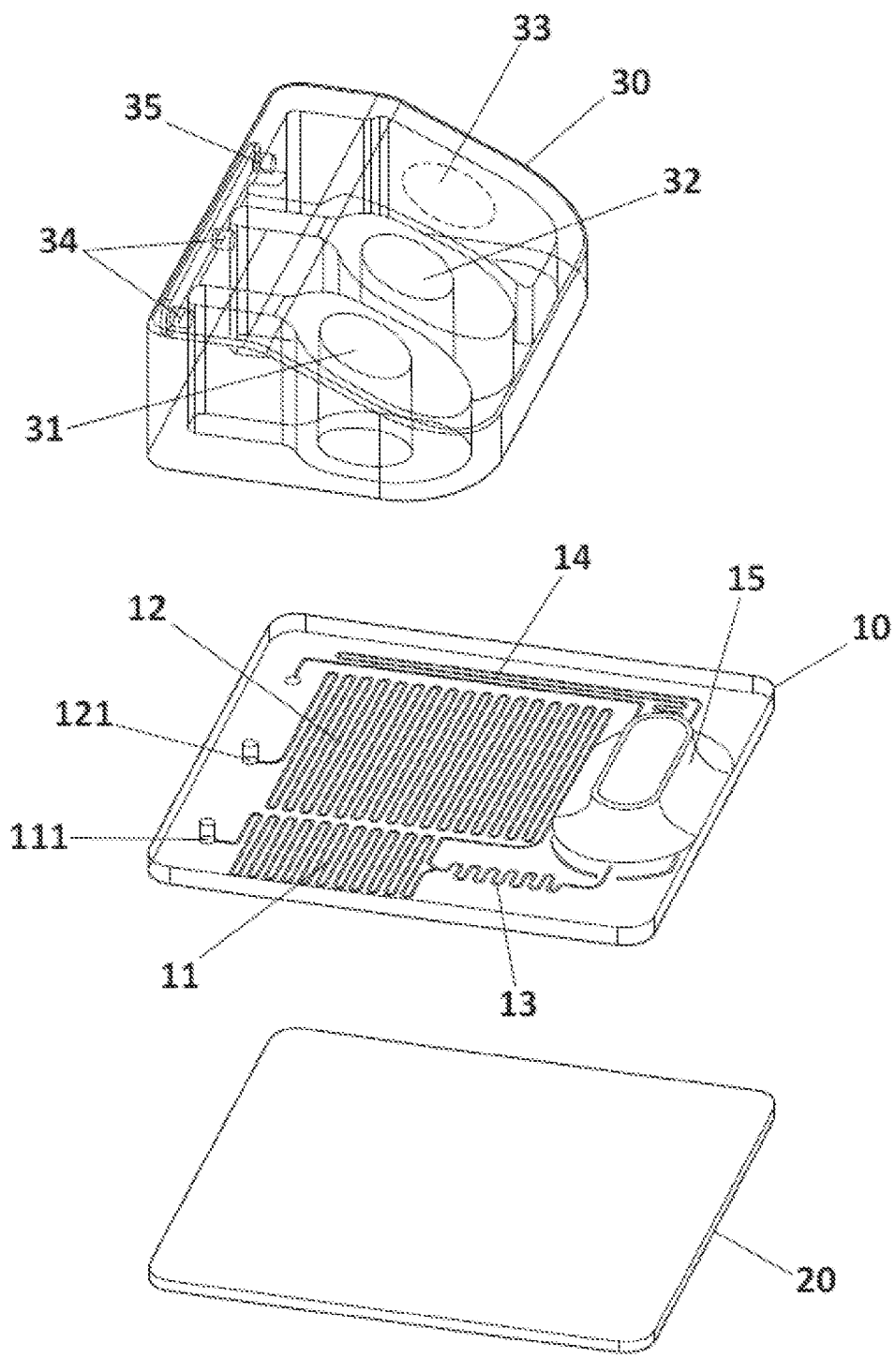
FIG. 3 shows a perspective view of the components of a biochip described herein.

FIG. 3 shows a perspective view of the biochip of FIG. 1. The example biochip can include three components: a first layer 10 with an imprinted circuit of microchannels, a cover 30 bonded to the upper surface of the first layer 10, and a second layer 20 bonded to the lower surface of the first layer 10. The first layer 10 can have four microfluidic channels 11, 12, 13, and 14; and a well 15. The cover 30 contains first reservoir 31, second reservoir 32, and third reservoir 33; two positive pressure inlets 34; and vacuum pressure inlet 35.

Figure 4:
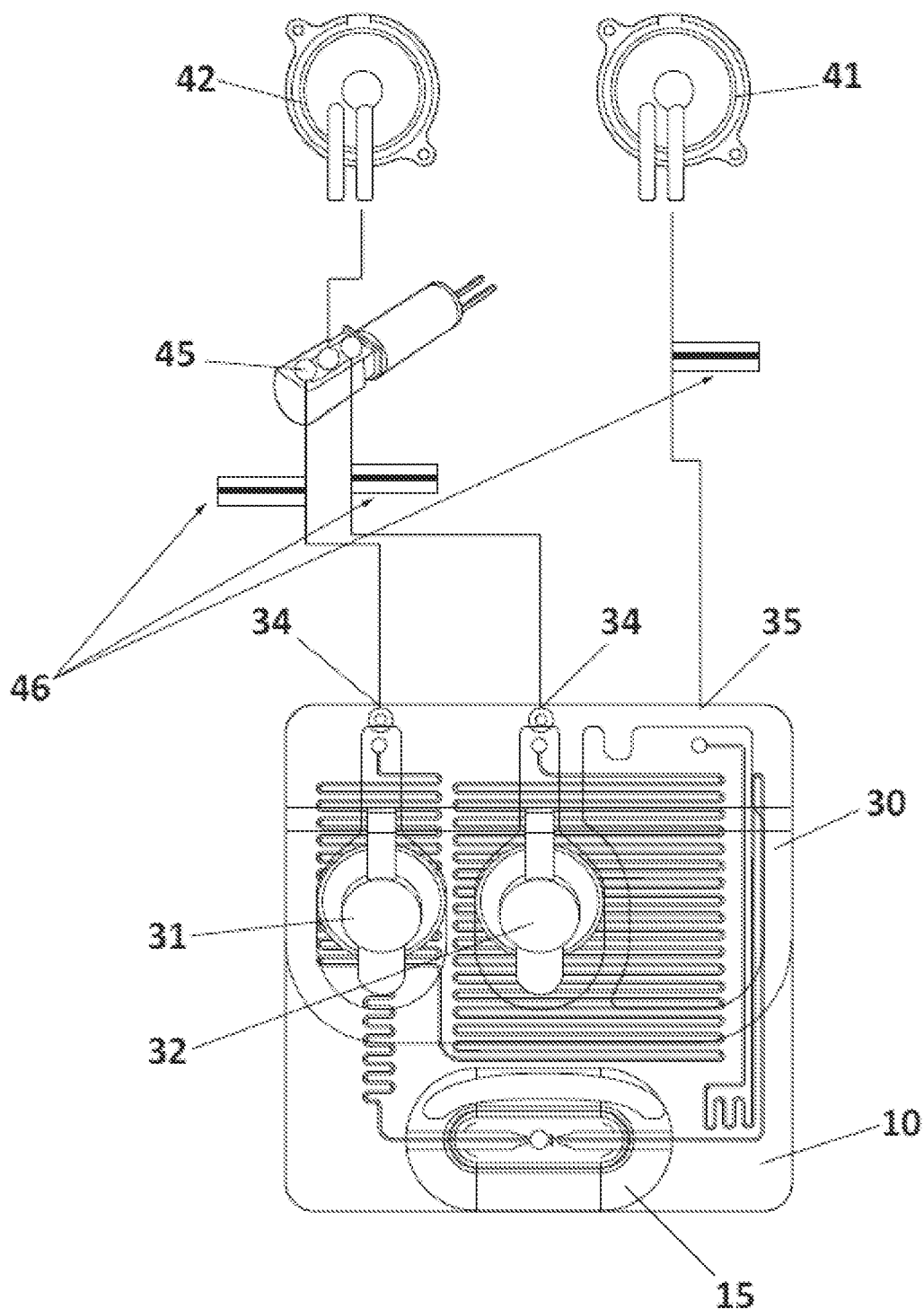
FIG. 4 shows an upper view of a biochip described herein that is coupled to a pumping system.

FIG. 4 shows the biochip of FIG. 1 in connection with pressure pumping systems. A positive pressure pumping system 42 can be connected to the biochip through connections 34 on cover 30 containing first reservoir 31 and second reservoir 32. The positive pumping system 42 can apply positive pressure to deliver a first solution from first reservoir 31 and to deliver a second solution from the second reservoir 32 to respective microfluid channels of the first layer 10. Valve 45 can control direction of the pressurized air generated by the pumping system to either the first reservoir 31 or the second reservoir 32. A negative pressure (vacuum) pumping system 41 can be connected to the biochip through connection 35. The vacuum pumping system 41 can apply negative pressure to draw waste fluid from the well 15. Each of the pressure systems can include controlled leaks 46, which allow pressurized air to exit the connections, e.g., during after actuation of the valve, thereby depressurizing the reservoirs.

The first microfluidic channel 11 has a first inlet 111 and a first outlet 112. The second microfluidic channel 12 has a second inlet 121 and a second outlet 122. The third channel has a third inlet 131 and a third outlet 132. The fourth channel 14 has a fourth inlet 141 and a fourth outlet 142. Further, the well 15 has a well inlet 151 for receiving the mixed solution and a well outlet 152 for removing the waste mixed solution from the well. The well 15 further has a top opening for receiving sample.

The first 11 and second 12 microfluidic channels are connected to the first 31 and second 32 reservoirs, respectively, through the first inlet 111 and second inlet 121 for introducing a first and second liquid solutions into the circuit and subsequently to the well 15. The first outlet 112 and second outlet 122 of each of channels 11 and 12 converge into the third inlet 131 of the third channel 13 such that the first and second solutions are mixed in the third channel 13. The third outlet 132 of the third channel 13 converges into the well 15 via inlet 151 such that the mixed solution is delivered into the well 15.

For extracting the solution from the well 15, the well outlet 152 can be connected to the fourth inlet 141 of the fourth channel 14 and the fourth outlet 142 of the channel can be connected to the third reservoir 33 where the solution from the well 15, considered waste, can be stored.

As shown in the first layer 10, the four microchannels describe paths that can include the shape of serpentines, the serpentines having different lengths. The length of the microchannels is determined depending on the cross-section of the microchannels as well as on the viscosities of the solutions carried by the microchannels in order to have a determined hydrodynamic resistance when the solutions flow through the channels so that the same flow rate of buffer solution and vitrification solution/revival solution can be maintained for a given pressure unit. Therefore, the length and cross-section of the microchannels depend on the viscosity of the solutions. Additionally, the serpentine path of the third channel 13 can allow the solutions from the first 11 and second 12 channels to be thoroughly mixed before entering the well 15. This third channel 13 therefore serves to mix two different solutions to achieve increasing or decreasing concentrations of the solutions reaching the well 15.

FIG. 5 shows perspective views of a well 15 of the biochip of FIG. 1. The well 15 can have a conical section. As shown in FIG. 5, Panel A, the well inlet 151 can be located at the bottom end of the well 15, which is in fluid connection with the third (mixing) channel outlet 132. The well outlet 152 can be in fluid connection with the fourth (waste) channel inlet 141 and can be elevated with respect to the well inlet 151. That is, the well outlet 152 can be located at a height above the well inlet 151, thereby preventing the bottom of the well and/or the loaded biological material from drying. For example, the location of the well outlet 152 can be located at a height than is greater than the height of the biological material that is loaded onto the bottom of well 15, e.g., the well outlet 152 can be elevated by approximately 1 mm (approximate height of an oocyte is about 200 μm). Further, the well inlet 151 and the well outlet 152 can have dimensions smaller than the diameter of the oocyte/embryo that is loaded in the well to avoid the cells from entering the microfluidic channels or leaving the well during efflux of solution, thereby containing the cells within the well. The smallest dimension for this inlet and outlet can be below 100 μm, or the minimum size of the cells. FIG. 5, Panels B and C show different side views of well 15 with respect to first layer 10 of the biochip.

Additionally, in an alternative, the outlet 152 of well 15 can include a mesh or filter 153 to prevent the escape of the cells through the outlet 152 as shown in FIG. 5, Panel D. In another alternative, the outlet 152 of well 15 can contain a longitudinal groove 154 having a width (<100 μm) that is smaller than the length (>150 μm) to prevent the escape of the cells (FIG. 5, Panel E) from the well 15.

Figure 6:
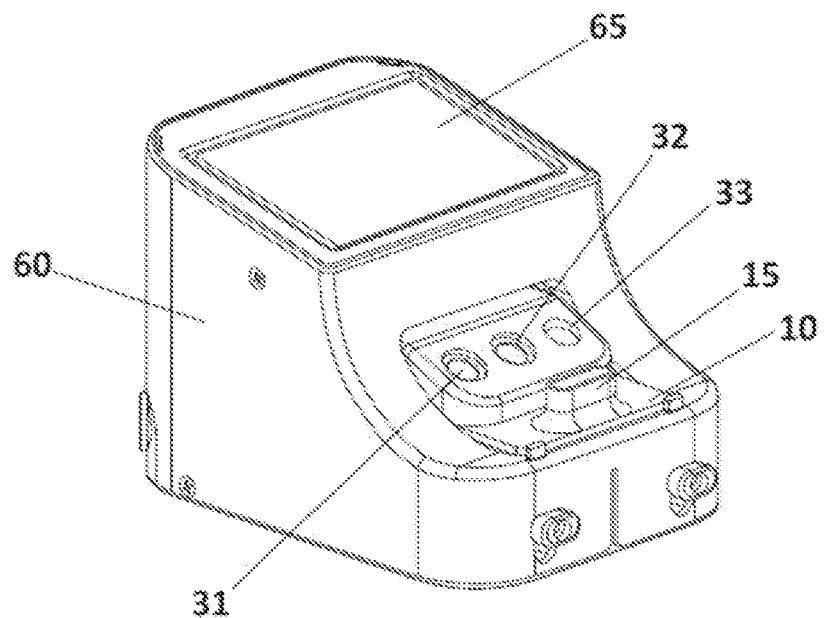
FIG. 6 shows an embodiment of a station described herein. Panel A shows a biochip station containing a biochip. Panel B shows a station without the biochip.
Figure 6:
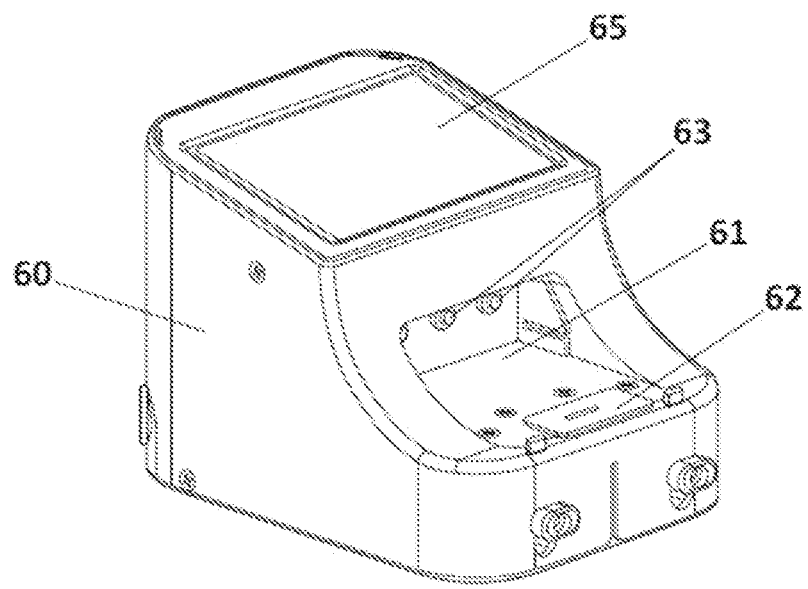

FIG. 6, Panel A shows a biochip is inserted in a station for controlling the chip. The station has a body 60 with a housing 61 for receiving the biochip 100; at least one positive pressure pumping system with connections 63 to the first 31 and second 32 reservoirs in the biochip; at least one negative pressure pumping system with connection 63 to the third reservoir 33 in the biochip; and a control unit, e.g., user interface 65. FIG. 6, Panel B shows the station without the biochip inserted to show a heating element 62. The heating element 62 can be located directly beneath well 15 when well 15 is inserted into the station. The heating element 62 can be configured to heat well 15 if desired.

The biochip 100 can be inserted into the housing 61 of the station 60 (FIG. 6A) such that the well 15 is kept outside the housing 61 and is accessible to a user via the top opening of well 15. Further, access to the reservoirs 31, 32, and 33 can remain outside the housing 61 of the station 60. The pressure inlets 34, 35 to the reservoirs 31, 32, and 33 can be introduced into the housing 61 such that the pressure inlets couple to the connection 63 of the pump systems inside the station. The positive pressure system can provide pressurized air to the first 31 and second 32 reservoirs in a sequential manner, i.e., by alternating the pressurized air from one reservoir to the other reservoir. Specifically, the connection 63 from the positive pumping system to the first 31 and second 32 reservoirs has a valve 45 to introduce air from the pumping system into the first reservoir 31 or into the second reservoir 32, but the connection 63 does not introduce air into both reservoirs simultaneously (see FIG. 4). To achieve this purpose, the connections between the valve 45 and the reservoirs 31, 32 can have controlled leaks 46 to allow the pressurized air to exit the connections after the valve 45 changes position from pressurizing one reservoir to the other reservoir, thereby depressurizing the reservoirs after each valve 45 movement.

Depending on the desired protocol, the solutions can sometimes require heating. In some embodiments, the station includes a heating element 62 to heat the well 15. The heating element can be in the housing 61 of the station 60 under the biochip 100 or can be located around the well, for example, as a heated crown or a heated coil.

In some embodiments, the station 60 includes a user interface, such as a touch screen, although other interfaces such as buttons could be used. The user interface 65 can provide a user with direct control over actions of the station 60, such as launch protocols and stop protocols. The user interface 65 can also advise the user when to load and/or remove the sample and can indicate protocol parameters, such as time, temperature, and station status. The user interface 65 can also be used for registering patient related information. The user can choose, for example, between one of four modes or protocols: a protocol for cryopreserving oocytes, a protocol for cryopreserving embryos, a protocol for thawing oocytes, and a protocol for thawing embryos.

The station can also include an electrical power supply for powering the pumping systems and the heating element, as well as a processor for controlling the operation of the different components in the station. In some embodiments, this power supply can be used to provide light, for example, to aid use of an external stereoscope or microscope that can be placed above the well for sample visualization. The power supply can be a battery or a plug that connects to an electrical outlet.

The above biochip 100 and station 60 can be used in cryopreparation or thawing of biological material, for example, cells such as oocytes or embryos. In both protocols, a solution can be delivered to the cell or cells. The solution can be a mixture of a first solution originating from the first reservoir 31 and a second solution originating from a second 32 reservoir. Mixing of the two solutions can take place in the third microchannel 13 of the biochip 100 before the mixture enters the well 15.

The method for delivering a liquid solution to a biological material in a well 15, allowing a fine control in gradient delivery of small volumes, and consequently fine control over concentration of the cryoprotectant agents in these solutions, results in lower osmotic shock and less risk of damage to the cells in the well 15 for higher developmental potential. This method can entail the following steps:

a) Priming the microchannels in the chip;
b) Placing or loading the biological material into the well 15;
c) Introducing into the first microfluidic channel 11 of a biochip 100 a first solution from the first reservoir 31 for at least a first determined period of time;
d) Stopping the introduction of the first solution into the first microfluidic channel 11;
e) Introducing into the second microfluidic channel 12 a second solution from the second reservoir 32 for at least a second determined period of time;
f) Stopping the introduction of the second solution into the second microfluidic channel 12; and
g) Repeating steps c) to f).

The method can include use of a positive pressure system 42 connected to both first 31 and second 32 reservoirs through an electro-mechanic valve 45 placed in the station 60. The valve 45 can be connected to the first reservoir 31 through a first pressure tube, and to the second reservoir 32 through a second pressure tube. The valve 45 can have two outlet positions and one inlet position. The inlet can be connected to the positive pumping system 42 and each of the two outlets can be connected to each of the pressure tubes. The valve 45 directs pressurized air, for example, originating from the pumping system 42 to one of the two reservoirs 31, 32. The valve 45 can change the direction of the pressurized air such that the air can be injected into one of the two reservoirs 31, 32 at a time for a specific period of time.

Figure 7:
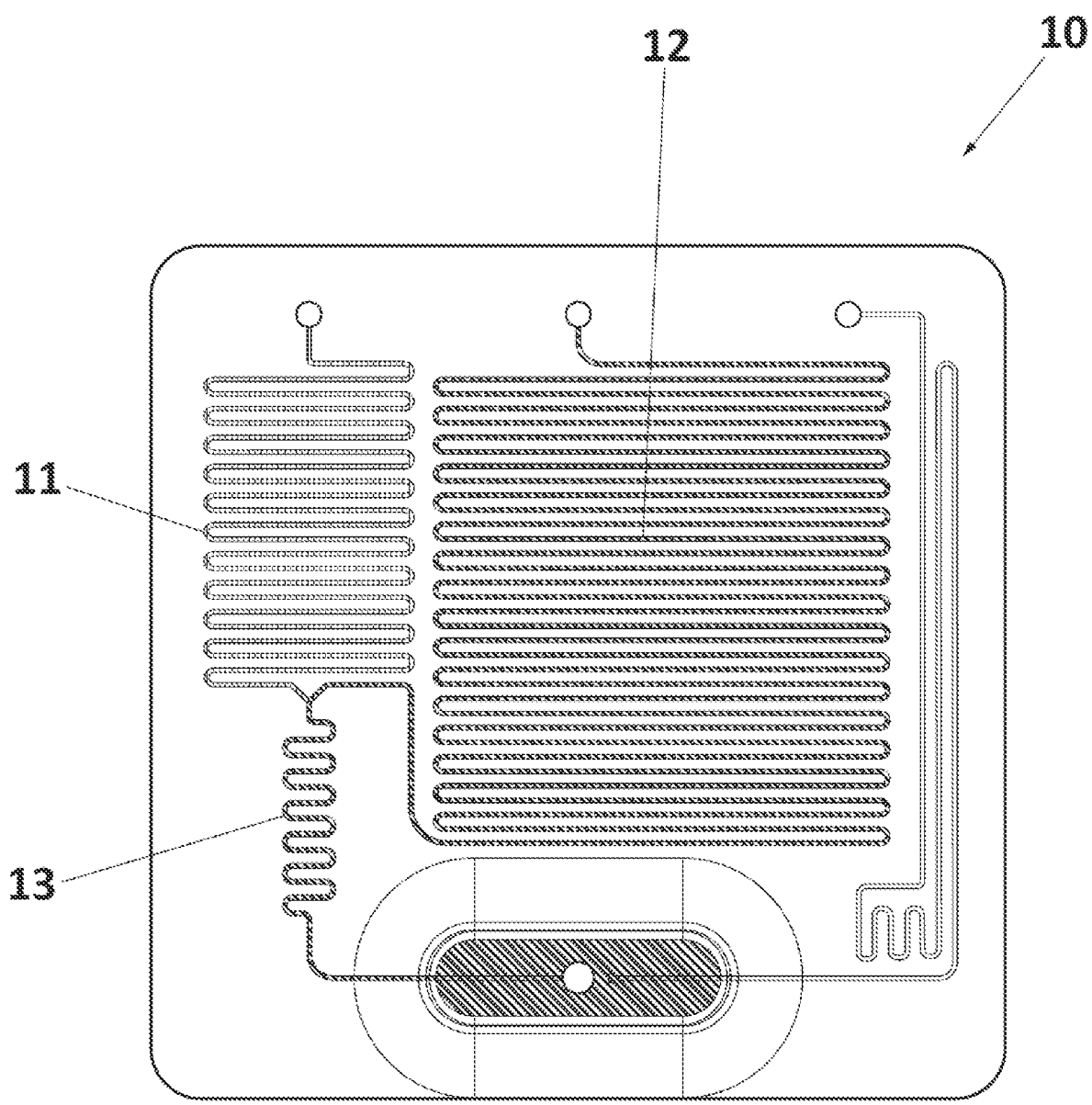
FIG. 7 shows a chip with the second and third microchannels filled with buffer solution and the first microchannel filled with vitrification solution or revival solution.
Figure 8:
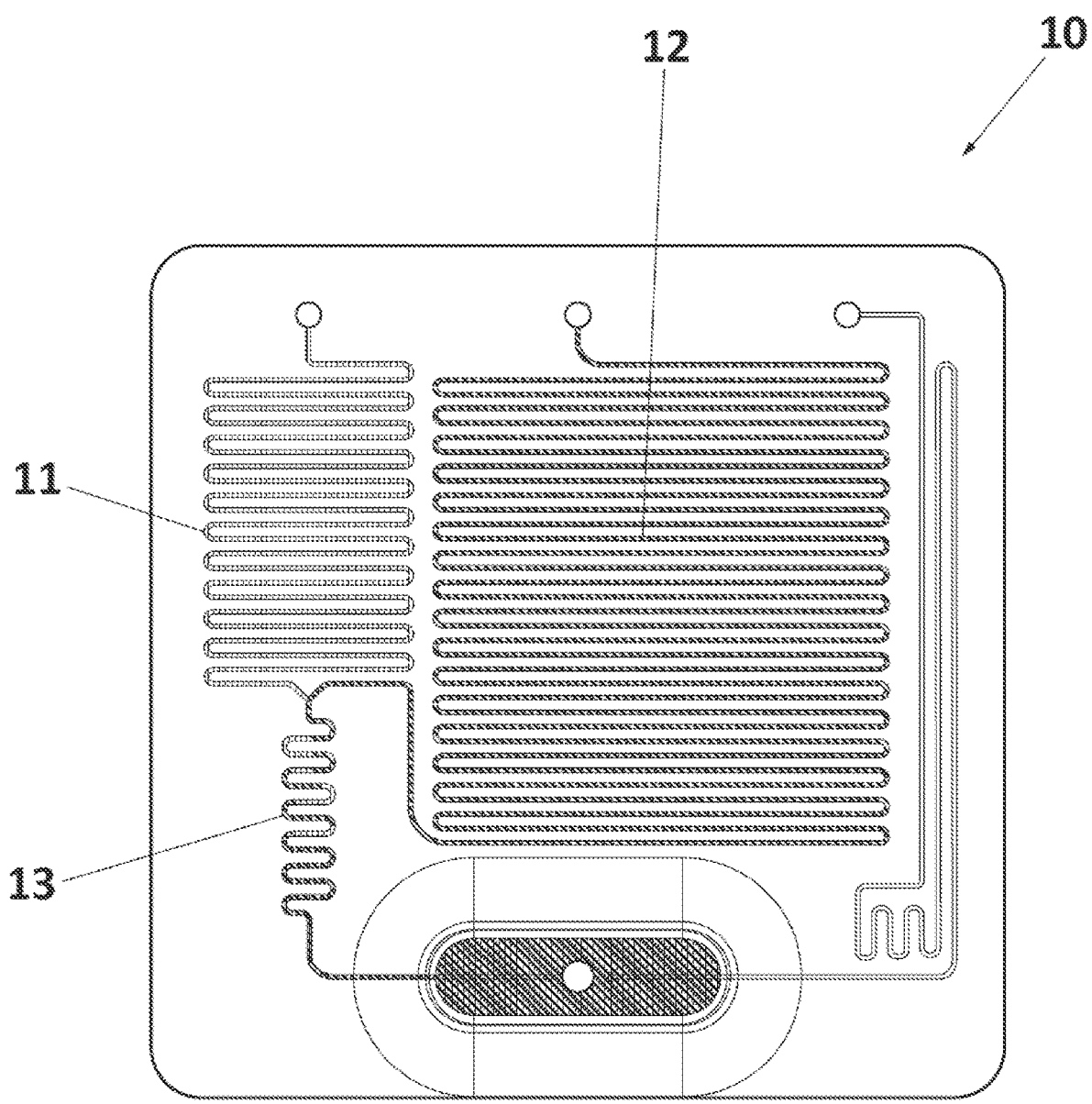
FIG. 8 shows a chip with the first and second microchannels filled with vitrification/revival solutions and buffer solutions, respectively, and the third microchannel filled with a mix of both solutions.
Figure 9:
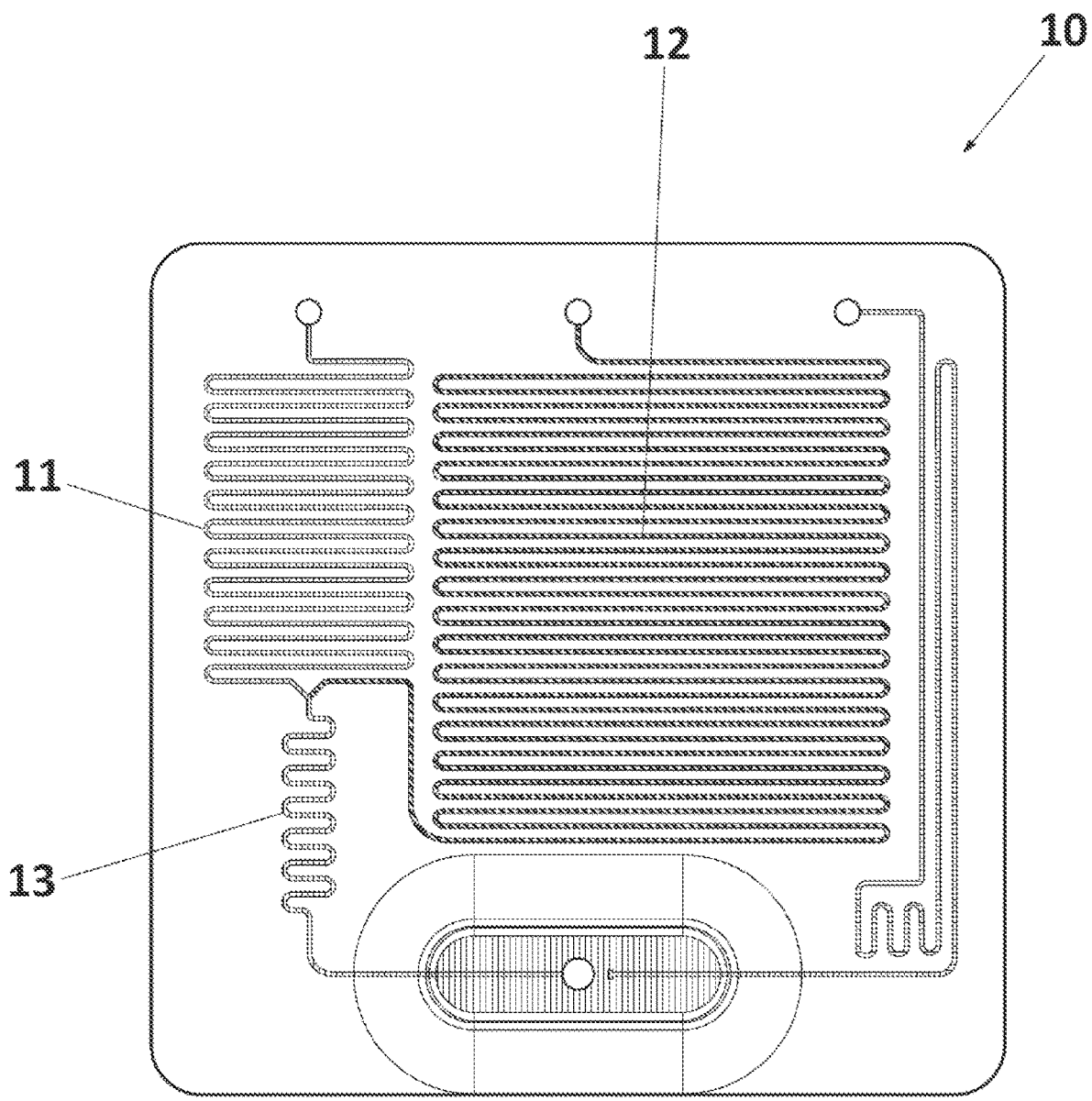
FIG. 9 shows a chip with the first and third microchannels filled with the vitrification solution or revival solution and the second channel filled with the buffer solution.
Figure 12:
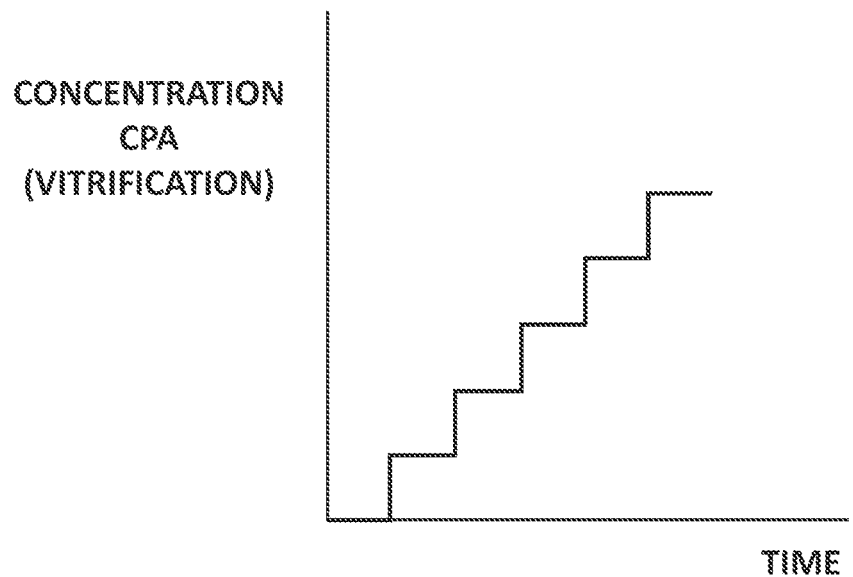
FIG. 12 is a diagram showing change in CPAs concentration against time in a cryopreparation protocol.
Figure 13:
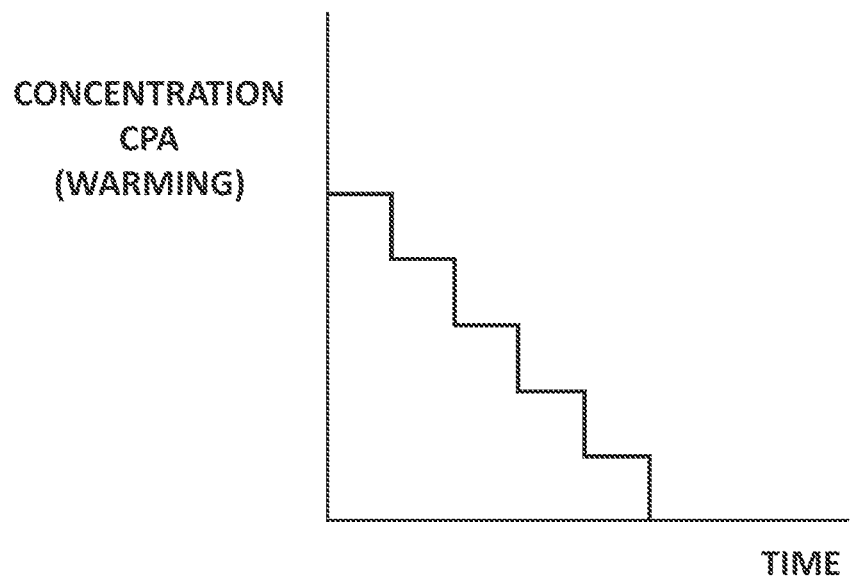
FIG. 13 is a diagram showing change in CPAs concentration against time in a revival protocol.

Depending on the protocol (e.g., cryopreparation or revival), the method can require increasing the volume of one of the two solutions entering from the first 31 or second 32 reservoirs. The volume of one solution can be slowly introduced to decrease gradually the concentration of the other solution such that the concentration of the first solution gradually predominates in the mixing channel 13 of first layer 10 (FIG. 7-9). For example, in a cryopreparation procedure, an increasing concentration of CPAs can be required. A first solution is a CPA solution (maximal amounts of CPA) and a second solution is a buffered solution (containing no CPA). The volume of the CPA solution can be slowly increased, while the volume of the buffered solution is decreased. This process results in an increasing gradient concentration of CPA reaching the well 15. FIG. 7 shows injection of the second solution (buffer solution) from the second reservoir through the second microfluidic channel 12, into the mixing channel 13, and then into well 15. In some embodiments, the two solutions are alternately injected on a step-by-step basis, in such a way that the concentration of one of the solutions increases or decreases (depending on the protocol) over time (FIGS. 12 and 13). FIG. 8 shows stepwise injection of the first solution (vitrification/revival solution) from the first reservoir through the first microfluidic channel 11, and second solution (buffer solution) from the second reservoir through the second microfluidic channel 12. Each of the first and second solutions then enter the mixing channel 13 and then into well 15. FIG. 9 shows injection of the first solution from the first reservoir through the first microfluidic channel 11, into the mixing channel 13, and then into well 15.

As pressure is used to inject solutions into the channels, the flow rate of the solutions can depend on the resistance in the channels. The resistance can depend on the viscosity of the solution being introduced, the length of the channel, and the cross-sectional dimension of the channel. Therefore, the positive pumping system 42 in the control station 60 can draw in, for example, external air, compress the air, and pressurize the pneumatic tube from the pump 42 towards the reservoirs 31 or 32. The pressurized air can then pass through the valve 45, which can direct the pressurized air into the reservoirs 31 or 32 containing the solutions, thereby injecting the solutions into the microfluidic channels 11 or 12, respectively. The solutions can then be mixed in the third channel 13 before reaching the well 15.

FIG. 7-9 show different steps of the method described herein for gradient delivery of a liquid solution to a biological material, for example, as applied to a cryopreparation and a thawing/revival protocol. Depending on the protocol, the sequence of the steps can be modified accordingly.

For a cryopreparation protocol, the sequence of the steps, as shown in FIG. 7-9, include:

a) Priming the microchannels of the chip.
b) After priming the microchannels of the chip, the first channel 11 is filled with the vitrification solution (VS) containing a maximal amount of cryoprotectant agents (CPA) until the VS merges with the second channel 12 and the buffer solution (BS) fills up the channels 12 and 13, and the well 15. This step is shown in FIG. 7.
c) The biological sample is then introduced in the well 15 that is filled with the BS.
d) The pulses injecting additional VS and BS in the first 11 and second 12 channels, respectively, start when the positive pump is activated. Depending on the position of the valve 45, the solution from the first 31 or second 32 reservoir is forced to enter either the first 11 or second 12 microchannels. By way of these pulses, the VS is mixed with the BS in the third channel 13. By increasing the amount of VS introduced into the channels, as compared to the amount of BS introduced, the concentration of VS increases in the well 15. The amount of VS introduced increases, while the amount of BS decreases as a result of gradient delivery of the solutions. This mixing can be seen in FIG. 8.
e) The protocol ends when the third channel 13 and the well 15 are completely filled of VS, and the biological sample is completely bathed in VS. This step can be seen in FIG. 9.
f) Finally, after the gradual shift from being completely submerged in a BS solution to a VS solution, the sample is extracted from the well 15.

Alternatively, in a revival, thawing, or warming protocol, a decreasing concentration of CPAs is required. Priming of the chip can slightly differ from the cryopreparation protocol such that the steps can be essentially reversed. The steps of a revival protocol can include:

a) Priming the microchannels of the chip.
b) After priming the microchannels of the chip, the first channel 11 is filled with revival solution (RS), as well as the channel 13 and the well 15. The second channel 12 is then filled with the buffer solution (BS) until the BS merges with the first channel 11. This step is shown in FIG. 9.
c) The biological sample is then introduced in the well 15 that is filled with RS.
d) The pulses injecting additional RS and BS into the first 11 channel and second channel 12, respectively, start when the positive pump is activated. Depending on the position of the valve 45, the solution from the first reservoir 31 or second reservoir 32 can be delivered to the first microchannel 11 or second microchannel 12. Through these pulses, the RS can thereby mix with the BS in the third channel 13 (FIG. 8). By increasing the amount of BS introduced into the channels, as compared to the amount of RS introduced, the concentration of BS increases in the well 15. The amount of BS introduced increases, while the amount of RS decreases as a result of gradient delivery of the solutions.
e) The protocol ends when the third channel 13 and the well 15 are completely filled of BS, and the biological sample is completely bathed in BS. This step can be seen in FIG. 7.
f) Finally, after a gradual shift from being completely submerged in a RS solution to a BS solution, the sample can be extracted from the well 15.

In some embodiments, for example, in a thawing protocol, the well 15 and/or the RS solution, can be heated through the heating element in the station 60.

Figure 10:
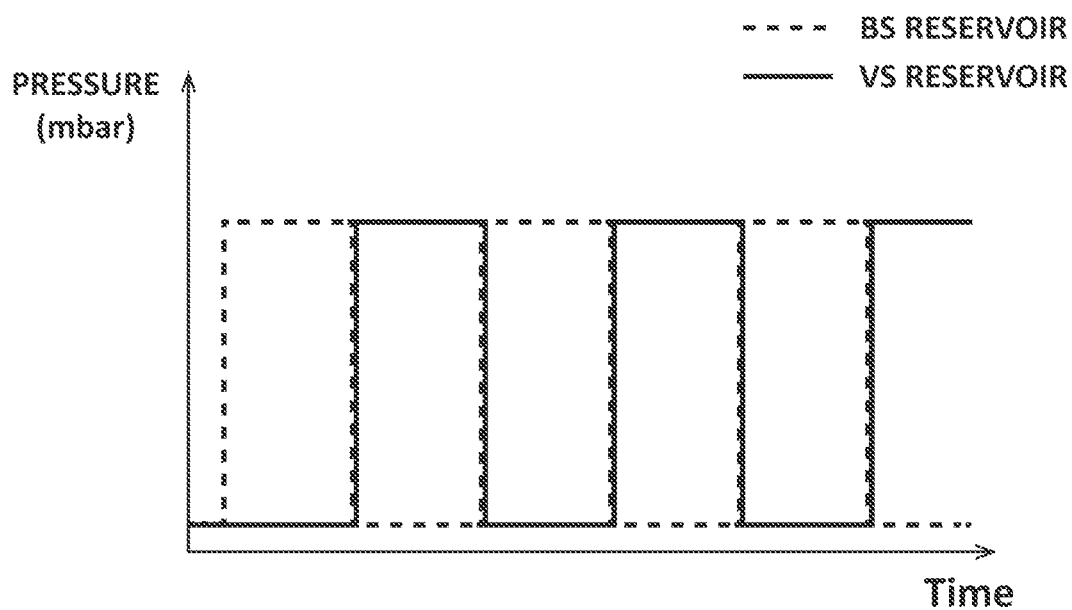
FIG. 10 is a diagram showing the injection pulses of the vitrification solution (VS) and buffer solution (BS) solution in a chip depending of the pressure (P) and time (t), where the pulses have the same pressure and same time duration.
Figure 11:
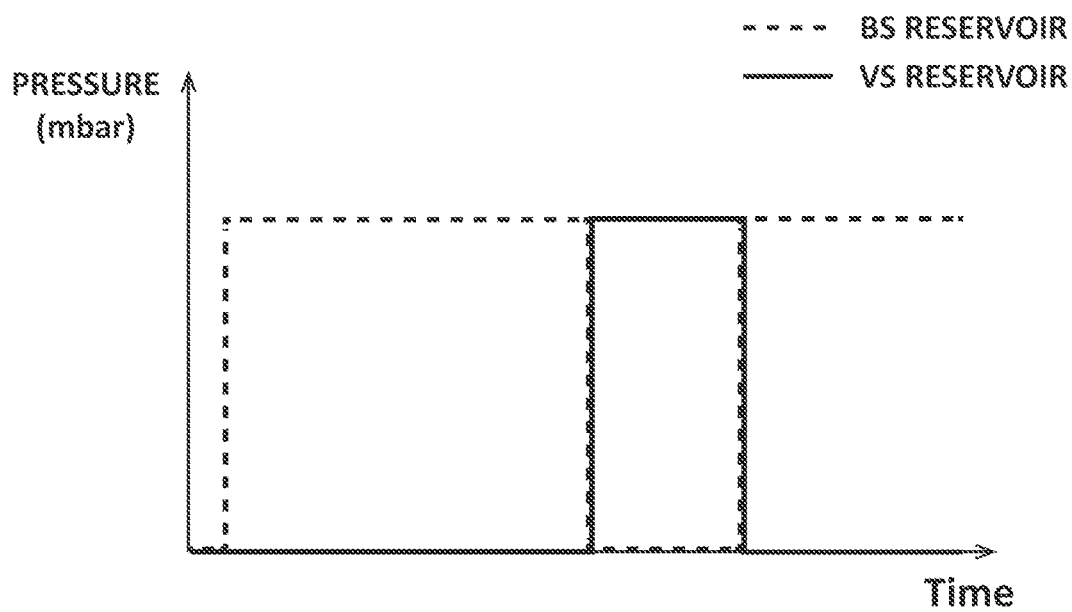
FIG. 11 is a diagram showing the injection of the pulses VS and BS solution in a chip depending of the pressure (P) and time (t), where the pulses have the same pressure but the duration of each pulse changes depending of the solution to be injected.

In the methods described herein, the injection of the solutions into the channels to increase the concentration of one of the solutions in the well can be essential to achieve optimum conditions for cryopreservation (prior to storage in LN2) or revival/thawing. Depending on the protocol, the VS/RS or BS can be increased in the third mixing channel 13 and in the well 15. This gradual increase in concentration can be achieved by increasing the frequency of the pulses for injecting a solution in the chip (FIG. 10) or by changing the conditions of the pulses. For example, a longer pulse can lead to a greater injection volume, whereas a shorter pulse can lead to a smaller injection volume (FIG. 11).

Methods of mixing the solutions in the chip for achieving a gradient delivery of said solutions can include:

- Pulses with the same volume of solution and the same time of injection for each pulse (FIG. 10), maintaining the injection pressure, but increasing the number of pulses for one of the solutions, such that the ratio of the number of pulses differs. Pulses of the same solution can be injected continuously or alternating with pulses of the other solution. In summary, each pulse can have the same volume and same duration of time, but a different number of pulses, thereby maintaining a constant pressure.
- Pulses with different volume and different duration depending on the solution to be injected, and also maintaining the pressure constant for both solutions. The volume can depend on the duration of the pulse (FIG. 11).
- Pulses modifying the pressure of each pulse. Therefore, by modifying the pressure, the volume and/or time of each pulse can be changed.

Example 2. A Cryopreparation Protocol Using a Microfluidic Device Described Herein In a cryopreparation protocol, after the biochip is inserted into the station, the first 11 and second 12 microchannels can be loaded with the first and second solution (vitrification and buffer solutions, respectively) according to methods described herein for gradient delivery of a solution to a biological material, for example, oocytes or embryos that are loaded in the well 15.

Steps of this protocol can include:

a) Inserting a biochip 100 into the housing 61 of a station 60.

b) Loading of the first 31 and second 32 reservoirs with a first and a second solution, respectively (i.e., a vitrification solution to the first reservoir and a buffer solution to the second reservoir).

c) Assuring the sealed closure of the reservoirs 31 and 32.

d) Priming step: Activating the positive pumping system 42 to push the vitrification solution from the reservoir 31 through the first microfluidic channel 11, from the inlet 111 up to the beginning of channel 13. Then, the buffer solution that is stored in the second reservoir 32 can be injected into the second microchannel 12, passing through the microchannel 13, and reaching the well 15.

e) Emptying the well 15 to the level of the well outlet 152 that is located above the well inlet 152 and stopping the pumping system 42.

f) Loading the biological sample(s) at the bottom of the well 15, for example, between 1 to 6 oocytes or embryos. In some embodiments, more than 6 oocytes or embryos can be loaded in the well 15.

g) Activating the positive pumping system 42 to deliver the first and second solutions according to the methods described herein. For example, the microfluidic channels 11, 12, and 13 can be loaded in a particular sequence for a fixed period of time to fill the well 15. Meanwhile, the vacuum pump 41 can draw waste fluid such that the liquid level in the well 15 is maintained at a constant level for the duration of the protocol. In this protocol, the volume of vitrification solution from the first reservoir 31 can be slowly introduced into the chip to gradually increase the amount of vitrification solution in the mixing channel 13, such that the vitrification solution predominates over the buffer solution. This mixing protocol can result in an increasing concentration of CPAs reaching the well 15 to obtain a maximal amount of CPAs. Injection of the vitrification solution can alternate between injection of the buffer solution on a step-by-step basis for a gradient delivery.

h) Stopping the pumping systems and removing the cells from the well 15.

In this vitrification protocol, the first reservoir can be loaded with a vitrification solution and second reservoir can be loaded with buffer solution. Thereafter, the station 60 can be initiated by the user through the interface 65, and the positive pressure pump 42 can be actuated automatically. The pressure pump can push the solutions from the first 31 and second 32 reservoirs through the first 111 and second 121 inlets and through the first 11, second 12, and third 13 microchannels. The solutions can be mixed in the third microchannel 13. The mixed solution can then enter the well 15 before expelling into the third reservoir or waste reservoir 33. In this manner, the biochip can be primed by wetting the microfluidic microchannels 11, 12, and 13, which can ensure a stable hydrodynamic resistance within the channels, and thus efficient flow control.

Thereafter, the station can automatically empty the well 15 to the level of the outlet height 152. At this point, the well 15 can be ready for sample loading. The oocyte/embryo can be loaded through the top opening of the well 15. After the biological sample is loaded at the bottom of the well 15, the station 60 can again be initiated. The cryopreservation mode can be selected to initiate a protocol that begins by delivering a small volume of vitrification solution. Subsequently, precise volumes of each of the vitrification and buffer solutions can be introduced in the first 11 and second 12 channels, respectively. The solutions can be injected alternatively in pulses. This injection process can be regulated by the valve 45 position such that varying volumes of each solution enter the mixing channel 13 to achieve thorough mixing and stepwise concentration increases in vitrification solution until maximal amounts of CPA reach the well 15 (FIG. 12). Meanwhile, withdrawal of the mixing fluid can occur at the well outlet 152 to maintain a fixed volume of fluid inside the well 15.

After the cryopreparation protocol is complete, the cells can be removed from the well 15 and transferred onto a carrier cryostorage device before plunging the cells into LN2, thereby completing the cryopreservation procedure. This final step can be a time sensitive process. In some embodiments, the transferring and freezing of the prepared cells can be completed between about 40-90 seconds. The microfluidic chip can then be discarded.

Example 3. A Thawing Protocol Using a Microfluidic Device Described Herein

Alternatively, a thawing protocol can be used with the microfluidic device described herein. A thawing protocol differs from a cryopreparation protocol such that the biochip 100 and station 60 can be used for the reverse procedure. In a thawing protocol, samples can be revived from cryopreservation. A thawing or warming protocol includes a step of warming the cells to about body temperature prior to the delivery of fluids to the cells. Steps of this thawing protocol can include:

a) Inserting a biochip 100 into the housing 61 of a station 60;
b) Loading of the first 31 and second 32 reservoirs with a first and a second solution, respectively (i.e., a revival solution (RS) into the first reservoir 31 and a buffer solution (BS) into the second reservoir 32);
c) Assuring the closure of the reservoirs 31 and 32;
d) Priming step: Activating the positive pumping system 42 to push the BS from the second reservoir 32 towards the second microchannel 12 until reaching the beginning of microchannel 13 and then pushing the RS from the first reservoir 31 into the first channel 11 until filling up the third (mixing) microchannel 13 and the well 15. In contrast to a cryopreservation protocol, the well 15 is filled with a higher volume of medium, in this case RS.
e) Heating the well 15 containing the RS to warm the RS to human body temperature or near human body temperature.
f) After the RS has reached the desired temperature, a sample carrier device containing the biological sample, for example, one or more oocytes/embryos is removed from LN2 storage, and plunged into the well 15 containing the RS. Exposure to the RS causes the cells to detach from the carrier device and remain inside the well 15, bathed in the RS.
g) Emptying the fluid from the well 15 to the level of the well outlet 152 that is located, for example, above the well inlet 151 by a vacuum pumping system 41 to the waste reservoir 33 and stopping the pumping system 41.
h) Activating the positive pumping system 42 to deliver the first and second solutions according to the methods described herein in a gradient delivery manner. For example, the microfluidic channels 11 and 12 can be loaded in a particular sequence for a fixed period of time to fill the well 15. Meanwhile, the vacuum pump can draw waste fluid from the channel 14 such that the liquid level in the well 15 is maintained at stable height. In this thawing, revival/warming protocol, the volume of BS from the second reservoir 32 can be slowly introduced into the second microchannel to increase gradually the amount of BS in the mixing channel 13, such that the BS predominates over the RS. This mixing protocol can thereby produce a step-wise decrease in the concentration of RS (maximal concentration of CPAs) reaching the well 15 containing the biological sample (FIG. 13).
i) Stopping the pumping system 41, 42 and removing the cells from the well 15.
j) Discarding the microfluidic chip.

The thawing protocol can be utilized after embryos or oocytes have been in long-term LN2 storage and are needed for an assisted reproduction treatment cycle. These cryopreserved biological samples (that are contained in a cryostorage device) can be revived prior to use. For this reason, the thawing protocols, such as those described herein can be used to enhance high cryosurvival rates.

As in the vitrification/cryopreservation method, the biochip 100 can be inserted into the housing 61 of the station 60 containing the fluid control pumping system. The biochip reservoirs 31 and 32 can be loaded with a RS and a BS, respectively. The RS (containing maximal amounts of CPA) in the first reservoir 31 can differ from the solution (VS) used in the vitrification protocol and the BS (containing no CPA) in the second reservoir 32 can be the same BS used in the vitrification protocol.

In this protocol, the biochip station 60 can be initiated by the user and the positive pressure pump system 42 can be actuated automatically by the station. Thereafter, the solutions in the first 31 and second 32 reservoirs can be pushed through the first 111 and second 121 channel inlets and down the first 11, second 12, and third 13 microchannels, through the well 15 to the fourth channel 14, and finally, into the waste reservoir 33. In this manner, the biochip can be primed by wetting the microfluidic microchannels before starting the protocol.

Thereafter, additional pure RS can be loaded into the well 15 to approximately a fixed level, for example, a volume of about 2.5-300 µL or 150-300 µL. The well 15 can then be heated with a heating element to warm the RS to human body or near human body temperature. After the desired temperature is reached, the sample carrier device (cryostorage device) can be removed from LN2 storage and plunged into the well 15 containing the heated RS solution for approximately 1 minute or less, for example, approximately 30-40 seconds. The sample can be detached from the cryostorage device and remain in the RS medium within the well 15.

Thereafter, the well 15 can be emptied to the level of the height of outlet 152, through the fourth channel 14 and this waste is received in the third reservoir 33. The thawing mode can be selected to initiate a thawing protocol that begins by delivering a small volume of BS. Subsequently, precise volumes of each of the RS and BS can be introduced into the first 11 and second 12 microchannels, respectively. The solutions can be injected alternately and in pulses. The injection process can be regulated by the valve 45 position such that varying volumes of each solution enter the mixing channel 13 to achieve thorough mixing and stepwise concentration decreases in cryoprotectants (i.e., RS) until only buffer is present in the well 15 (containing no or minimal CPAs) as shown in FIG. 13. Meanwhile, withdrawal of the mixing fluid occurs at the well outlet 152 such that a fixed volume of solution can be maintained in the well 15. After the thawing protocol ends, the cells can be retrieved from the well for use. The microfluidic chip can then be discarded.

Example 4. A Microfluidic Device Described Herein and Uses Thereof

Figure 14:
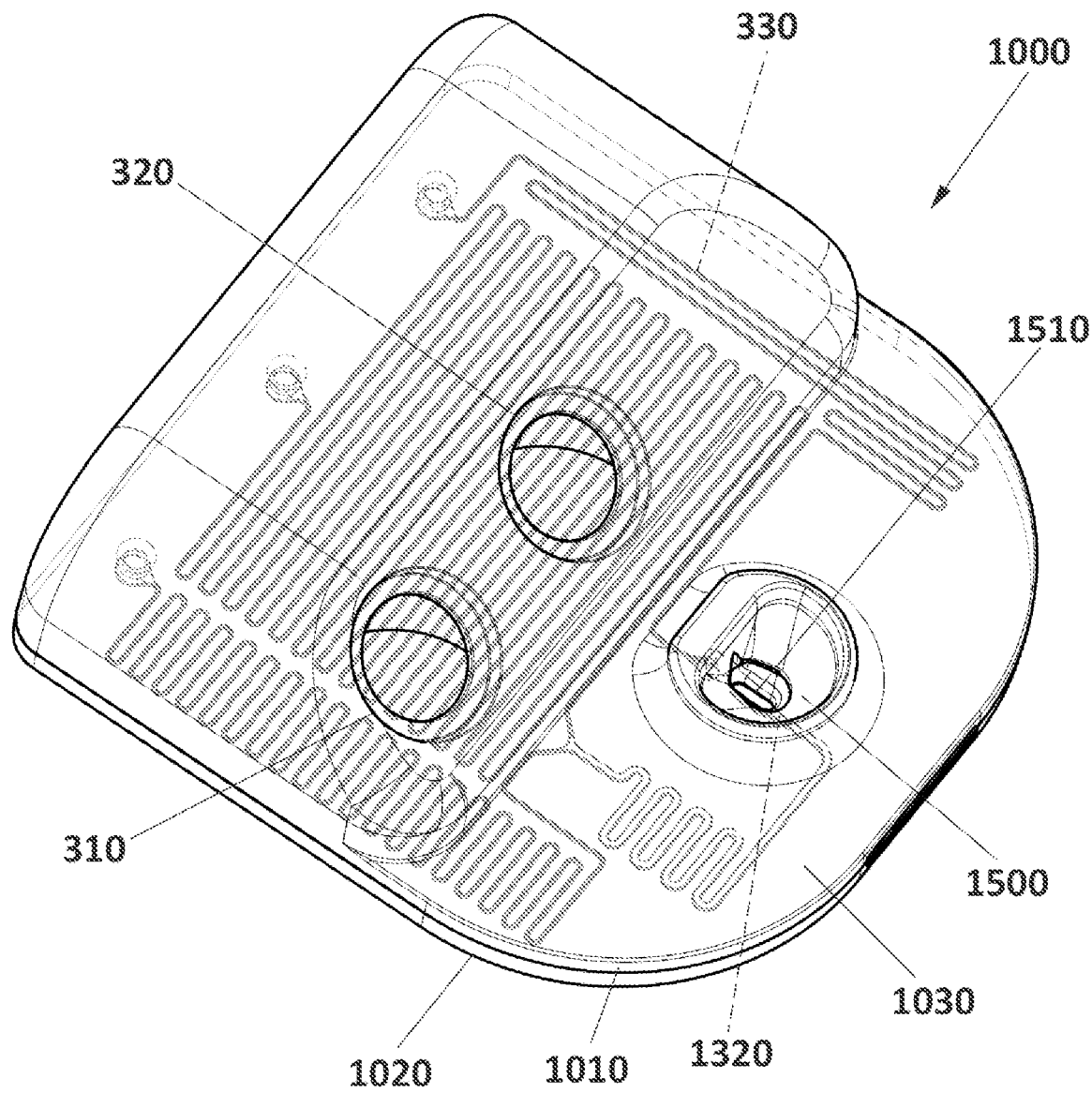
FIG. 14 shows an embodiment of a biochip described herein.

FIG. 14 shows an alternative embodiment of a biochip 1000. Biochip 1000 includes a first layer 1010 with an imprinted circuit of microchannels on the lower surface of the layer 1010, which is covered by a second layer 1020 that is below the lower surface of the first layer 1010. The biochip 1000 further has a cover 1030 bonded to the upper surface of the first layer 1010. The cover 1030 includes reservoirs 310 and 320 for storing liquid solutions. The cover 1030, in addition to reservoirs 310 and 320, includes a well 1500 having a cylindrical wall. The well 1500 allows containment of a large volume of sample. The well configuration can be advantageous for, e.g., containing a warming solution for the thawing protocol. Further, the cylindrical wall provides an ergonomic construction to allow an easy introduction of a cryostorage device inside and outside the well 1500.

Figure 15:
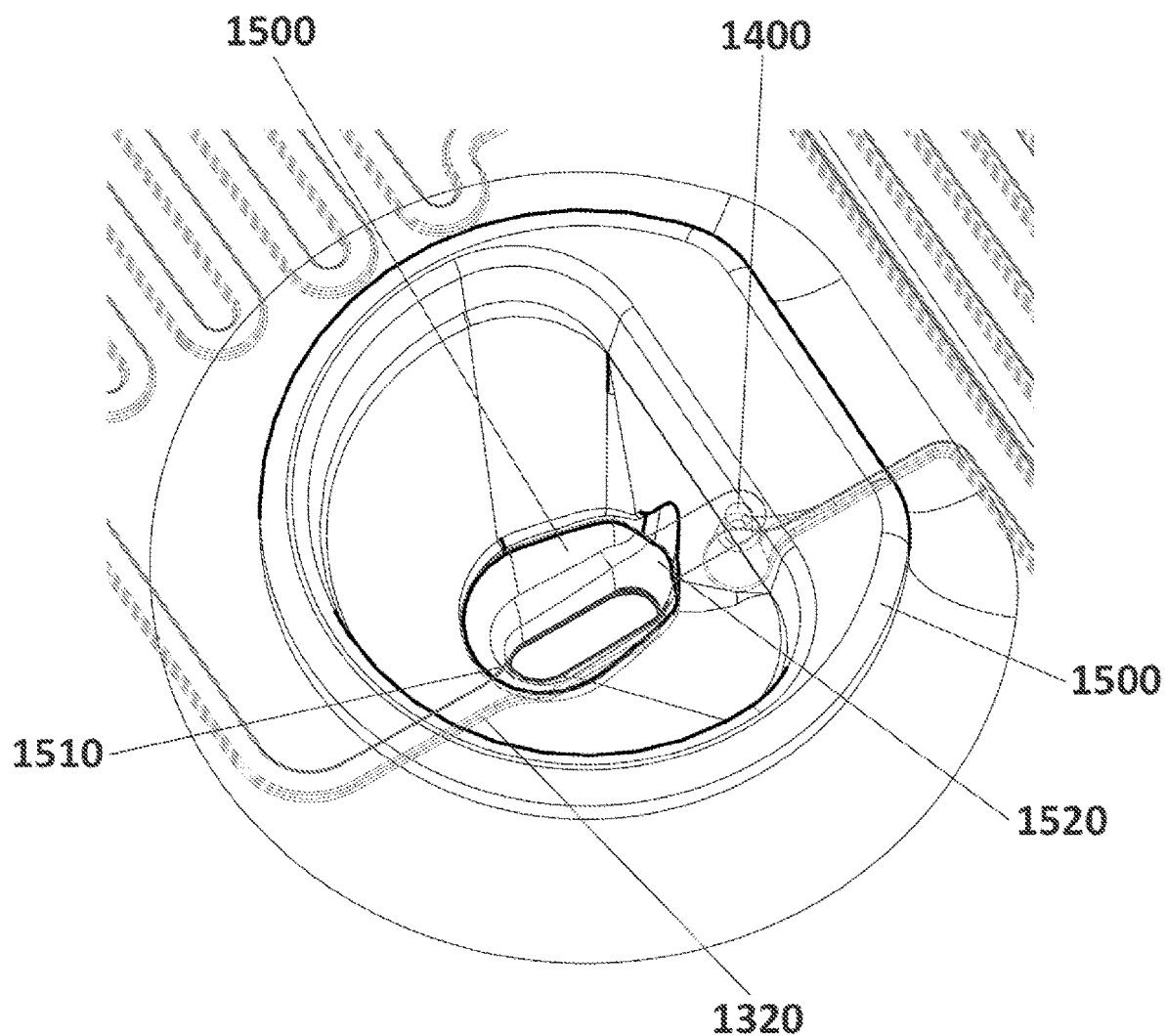
FIG. 15 shows an upper view of a well of the biochip of FIG. 14.

As shown in FIG. 14 and FIG. 15, well 1500 can include an upper conical section and a lower cylindrical chamber that joins well inlet 1510, which coincides with the mixing channel outlet 1320. Well inlet 1510 and mixing channel outlet 1320 can each have a different shape than the prior embodiments described herein (see FIG. 5). Further, well outlet 1520 can be located at a height above the well inlet 1510. The well outlet 1520 can also include a mesh or filter to prevent the escape of the cells through the well outlet 1520, e.g., during efflux of a solution from the outlet. The well outlet 1520 can be connected to the fourth channel inlet 1400 that is connected to the third reservoir 330 where the solution from the well 1500, e.g., waste solution, can be stored.

Figure 16:
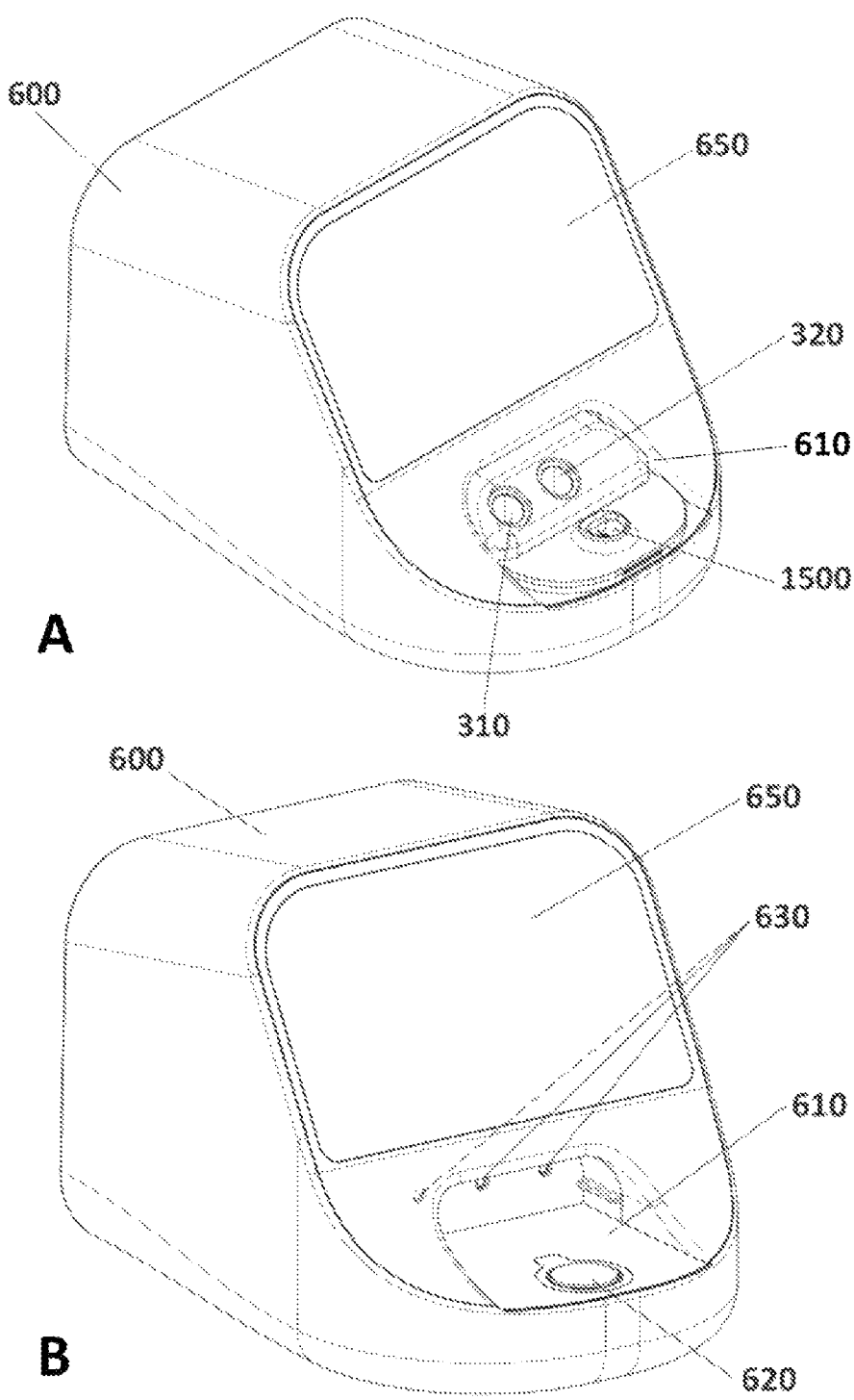
FIG. 16 shows an embodiment of a biochip station described herein. Panel A shows a biochip station containing a biochip. Panel B shows a station without the biochip.

FIG. 16 shows an embodiment of a biochip station described herein. FIG. 16, Panel A shows a biochip inserted in a station used for controlling the biochip. FIG. 16, Panel B shows the station without the biochip inserted. The station includes a body 600 with a housing 610 for receiving the biochip, at least one positive pressure pumping system with connections 630 to the first reservoir 310 and second reservoir 320 of the biochip, at least one negative pressure system with connection 630 to the third reservoir 330 of the biochip 1000, and a control unit, e.g., user interface 650 (see FIG. 16, Panel B). FIG. 16, Panel B further shows heating element 620. The heating element 620 can be located at the base of the housing 610 beneath the well 1500 and configured to heat the biochip 1000 when inserted into the station. The heating element 620 can be a transparent, circular shaped body, e.g., a glass body. The heating element 620 can be heated, e.g., to heat the biochip 1000 from below. The heating element 620 can emit light from a light source, e.g., emitting from beneath the heating element 620, to light or illuminate the well 1500 from below. The light source can help to illuminate contents within the well 1500 for improved viewing. In some cases, a microscope can be placed on top of the well 1500 to assist viewing in combination with the light source.

Embodiments

Embodiment A1. A microfluidic chip (100) comprising:
A first layer (10) that comprises:
  a first microfluidic channel (11) for the introduction of a first solution, a second microfluidic channel (12) for the introduction of a second solution, a third microfluidic channel (13) placed after the first and second microfluidic channels for mixing the first and second solutions to provide a mixed solution, and a fourth microfluidic channel (14) for the removal of the mixed solution; and
  a well (15) with a well inlet (151) for receiving the mixed solution from the third channel and a well outlet (152), placed above the well inlet (151), connected with the fourth channel for removing the mixed solution from the well; and
  a cover (30) bonded to the first layer (10) that comprises: a first reservoir (31) for storing the first solution and connected to the first channel (11), a second reservoir (32) for storing the second solution and connected to the second channel (12), and a third reservoir (33) for receiving the mixed solution connected to the fourth channel (14), wherein at least the first and second reservoirs have an access capable of pressurizing the reservoir.

Embodiment A2. The microfluidic chip of embodiment A1, wherein each of the first microfluidic channel, the second microfluidic channel, the third microfluidic channel, and the fourth microfluid channel are imprinted on the lower surface of the first layer and are covered with a second layer (20).

Embodiment A3. The microfluidic chip of embodiment A1, wherein each of the first microfluidic channel, the second microfluidic channel, the third microfluidic channel, and the fourth microfluid channel are imprinted on the upper surface of the first layer and are covered by a second layer.

Embodiment A4. The microfluidic chip of any one of embodiments A1-A3, wherein at least one of the microfluidic channels has a serpentine path.

Embodiment A5. The microfluidic chip of any one of embodiments A1-A4, further comprising a connection means (34) for connecting a positive pressure pumping system to the first (31) and second (32) reservoirs.

Embodiment A6. The microfluidic chip of any one of embodiments A1-A5, further comprising connection means (35) for connecting a negative pressure pumping system to the third reservoir (33).

Embodiment A7. A station for a microfluidic chip comprising:
  a body with a housing for receiving the microfluidic chip of any one of embodiments A1-A6;
  at least one positive pressure pumping system with connection means to the first and second reservoirs in the biochip;
  at least one negative pressure pumping system with connection means to the third reservoir in the biochip; and
  a control unit.

Embodiment A8. The station of embodiment A7, wherein the well and the accesses to the reservoirs remain outside the body to be accessible.

Embodiment A9. The station of embodiment A7 or A8, wherein the connection means to the first and second reservoirs comprises a valve to introduce air from the pumping system into the first reservoir or into the second reservoir.

Embodiment A10. The station of any one of embodiments A7-A9, further comprising a heating element.

Embodiment A11. A method for delivering a liquid solution to a biological material, comprising:
  a) placing the biological material into the well;
  b) introducing into the first microfluidic channel of the microfluidic chip of any one of embodiments A1-A6 a first solution from the first reservoir for at least a first determined period of time;
  c) stopping the introduction of the first solution into the first microfluidic channel;
  d) introducing into the second microfluidic channel a second solution from the second reservoir for at least a second determined period of time;
  e) stopping the introduction of the second solution into the second microfluidic channel; and
  f) repeating the sequence of steps b) to e) several times.

Embodiment A12. The method of embodiment A11, wherein the duration of the first and second periods for the introduction of the first and second solution change in time.

Embodiment A13. The method of embodiment A11 or A12, wherein the pressure or volume of the introduction of the first and second solutions change maintaining the first and second periods constant.

Embodiment A14. The method of any one of embodiments A11-A13, wherein prior to step a) the biochip is introduced in a station according to embodiment A7.

Embodiment B1. A device comprising:
  a) a microfluidic chip that comprises:
    i) a first channel that comprises:
      a first channel inlet configured to receive a first solution; and
      a first channel outlet connected to a mixing channel and configured to deliver the first solution to the mixing channel;

ii) a second channel that comprises:
  a second channel inlet configured to receive a second solution; and
  a second channel outlet connected to the mixing channel and configured to deliver the second solution to the mixing channel; and
iii) the mixing channel that comprises:
  a mixing channel inlet configured to receive the first solution and the second solution and mix the first solution with the second solution, thereby providing a mixture of the first solution and the second solution; and
  a mixing channel outlet configured to deliver the first solution, the second solution, or the mixture of the first solution and the second solution to a well; and
b) the well that comprises:
  i) a top opening configured to receive a biological material from outside the device and contain the biological material within the well;
  ii) a well inlet connected to the mixing channel outlet and configured to receive the mixture of the first solution and the second solution from the mixing channel outlet, wherein the well inlet is at a bottom end of the well; and
  iii) a well outlet configured to expel a waste solution from the well, wherein the well outlet is located at a height above the bottom end of the well, wherein the height above the bottom end of the well outlet is greater than a height of the biological material that is received in the well.

Embodiment B2. The device of embodiment B1, wherein the well is configured to allow uniform exposure of the biological material to the mixture of the first solution and the second solution.

Embodiment B3. The device of embodiment B1 or B2, wherein the biological material is not contained to the well by a holding microchannel.

Embodiment B4. The device of any one of embodiments B1-B3, further comprising a first reservoir on the microfluidic chip and connected to the first channel, wherein the first channel receives the first solution from the first reservoir.

Embodiment B5. The device of embodiment B4, further comprising a positive pressure pumping system connected to the first reservoir, wherein the positive pressure pumping system directs pressurized air into the first reservoir to deliver the first solution from the first reservoir to the first channel.

Embodiment B6. The device of embodiment B4 or B5, wherein the first reservoir is accessible from outside the device.

Embodiment B7. The device of any one of embodiments B1-B6, further comprising a second reservoir on the microfluidic chip and connected to the second channel, wherein the second channel receives the second solution from the second reservoir.

Embodiment B8. The device of embodiment B7, wherein the positive pressure pumping system is further connected to the second reservoir, wherein the positive pressure pumping system directs pressurized air into the second reservoir to deliver the second solution from the second reservoir to the second channel.

Embodiment B9. The device of embodiment B7 or B8, wherein the positive pressure pumping system comprises a valve configured to direct pressurized air between the first reservoir and the second reservoir.

Embodiment B10. The device of any one of embodiments B7-B9, wherein the second reservoir is accessible from outside the device.

Embodiment B11. The device of any one of embodiments B1-B10, further comprising a waste channel on the microfluidic chip and connected to the well outlet, wherein the waste channel comprises:
  i) a waste channel inlet configured to receive the waste solution from the well outlet; and
  ii) a waste channel outlet configured to expel the waste solution from the waste channel.

Embodiment B12. The device of embodiment B11, further comprising a waste reservoir on the microfluidic chip and connected to the waste channel outlet, wherein the waste reservoir is configured to receive the waste solution.

Embodiment B13. The device of embodiment B12, further comprising a negative pressure pumping system connected to the waste reservoir, wherein the negative pressure pumping system draws a solution from the waste reservoir.

Embodiment B14. The device of any one of embodiments B1-B13, wherein the well is configured to prevent drying of the biological material during efflux of a solution.

Embodiment B15. The device of any one of embodiments B1-B13, wherein the well is configured to prevent the biological material from being swept out of the well by efflux of a solution.

Embodiment B16. The device of embodiment B15, wherein the well has a filter.

Embodiment B17. The device of any one of embodiments B1-B16, further comprising a pressure pumping system and a control unit, wherein the pressure pumping system is connected to the first channel, the second channel, or the well, wherein the pressure pumping system is configured to pressurize the first channel, the second channel, or the well, wherein the control unit is connected to the pressure pumping system and wherein the control unit is configured to actuate the pressure pumping system.

Embodiment B18. The device of any one of embodiments B1-B16, further comprising a pressure pumping system and a control unit, wherein the pressure pumping system is connected to the first channel, the second channel, or the waste channel, wherein the pressure pumping system is configured to pressurize the first channel, the second channel, or the waste channel, wherein the control unit is connected to the pressure pumping system and wherein the control unit is configured to actuate the pressure pumping system.

Embodiment B19. The device of any one of embodiments B1-B18, wherein the first channel is serpentine shaped.

Embodiment B20. The device of any one of embodiments B1-B19, wherein the second channel is serpentine shaped.

Embodiment B21. The device of any one of embodiments B1-B20, wherein the mixing channel is serpentine shaped.

Embodiment B22. The device of any one of embodiments B11-B21, wherein the waste channel is serpentine shaped.

Embodiment B23. The device of any one of embodiments B1-B22, wherein the well outlet has a dimension and the biological material has a diameter, wherein the dimension of the well outlet is smaller than the diameter of the biological material.

Embodiment B24. The device of any one of embodiments B1-B23, wherein the biological material is a cell.

Embodiment B25. The device of any one of embodiments B1-B23, wherein the biological material is an oocyte.

Embodiment B26. The device of any one of embodiments B1-B23, wherein the biological material is a zygote.

Embodiment B27. The device of any one of embodiments B1-B23, wherein the biological material is an embryo.

Embodiment B28. The device of any one of embodiments B1-B23, wherein the biological material is a blastocyst.

Embodiment B29. The device of any one of embodiments B1-B28, further comprising a heating element and a housing, wherein the heating element is connected to the housing of the device, wherein the heating element heats the microfluidic chip and contents therein.

Embodiment B30. The device of embodiment B29, wherein the heating element is transparent such that the heating element allows passage of light from a light source to illuminate the well.

Embodiment B31. The device of any one of embodiments B1-B30, wherein the well outlet comprises a filter that obstructs escape of the biological material through the well outlet.

Embodiment B32. The device of any one of embodiments B1-B31, wherein the microfluidic biochip is removeable from the device.

Embodiment B33. A method for delivering a solution to a biological material, the method comprising:
  a) loading the biological material to the well of the device of any one of embodiments B1-B32;
  b) introducing into the first channel an initial aliquot of the first solution from a first reservoir for an initial time period at an initial pressure level, thereby introducing the first solution to the biological material in the well;
  c) stopping introduction of the first solution from the first reservoir into the first channel;
  d) introducing into the second channel an initial aliquot of the second solution from a second reservoir for an initial time period at an initial pressure level, thereby introducing the second solution to the biological material in the well; and
  e) stopping the introduction of the second solution from the second reservoir into the second channel, thereby delivering the solution to the biological material.

Embodiment B34. The method of embodiment B33, further comprising introducing into the first channel a second aliquot of the first solution from the first reservoir for a second time period at a second pressure level, wherein the second aliquot of the first solution is a greater volume than the initial aliquot of the first solution is.

Embodiment B35. The method of embodiment B33, further comprising introducing into the first channel a second aliquot of the first solution from the first reservoir for a second time period at a second pressure level, wherein the second aliquot of the first solution is a lesser volume than the initial aliquot of the first solution is.

Embodiment B36. The method of any one of embodiments B33-B35, further comprising introducing into the first channel a second aliquot of the first solution from the first reservoir for a second time period at a second pressure level, wherein the second time period is greater than the initial time period is.

Embodiment B37. The method of any one of embodiments B33-B35, further comprising introducing into the first channel a second aliquot of the first solution from the first reservoir for a second time period at a second pressure level, wherein the second time period is lesser than the initial time period is.

Embodiment B38. The method of any one of embodiments B33-B37, further comprising introducing into the first channel a second aliquot of the first solution from the first reservoir for a second time period at a second pressure level, wherein the second pressure level is greater than the initial pressure level is.

Embodiment B39. The method of any one of embodiments B33-B37, further comprising introducing into the first channel a second aliquot of the first solution from the first reservoir for a second time period at a second pressure level, wherein the second pressure level is lesser than the initial pressure level is.

Embodiment B40. The method of any one of embodiments B33-B39, wherein the introduction of the first solution into the first channel is by actuating positive pressure within the first channel.

Embodiment B41. The method of any one of embodiments B33-B40, wherein the introduction of the second solution into the second channel is by actuating positive pressure within the second channel.

Embodiment B42a. The method of any one of embodiments B33-B41, wherein the method is a cryopreservation procedure, wherein the first solution is a vitrification solution and the second solution is a buffer solution.

Embodiment B42b. The method of any one of embodiments B33-B41, wherein the method is a cryopreservation procedure, wherein the first solution is a buffer solution and the second solution is a vitrification solution.

Embodiment B43a. The method of any one of embodiments B33-B41, wherein the method is a thawing procedure, wherein the first solution is a buffer solution and the second solution is a revival solution.

Embodiment B43b. The method of any one of embodiments B33-B41, wherein the method is a thawing procedure, wherein the first solution is a revival solution and the second solution is a buffer solution.

Embodiment B44. The method of any one of embodiments B33-B43, further comprising priming the first channel with the first solution prior to a).

Embodiment B45. The method of any one of embodiments B33-B44, further comprising priming the second channel with the second solution prior to d).

Embodiment B46. The method of any one of embodiments B33-B45, further comprising priming the mixing channel with the second solution prior to d).

Embodiment B47. The method of any one of embodiments B33-B46, further comprising heating the device.

Embodiment B48. The method of any one of embodiments B33-B47, further comprising removing the biological material from the well after delivering the solution to the biological material.

Embodiment B49. The method of any one of embodiments B33-B48, further comprising submerging the biological material in liquid nitrogen after delivering the solution to the biological material.

Embodiment B50. The method of any one of embodiments B33-B49, further comprising repeating b)-e) until the well contains about 100% of the first solution and about 0% of the second solution.

Embodiment B51. The method of any one of embodiments B33-B49, further comprising repeating b)-e) until the well contains about 0% of the first solution and about 100% of the second solution.

Embodiment B52. The method of any one of embodiments B33-B49, further comprising repeating b)-e) by increasing in consecutive introductions the initial aliquot of the first solution and reducing in consecutive introductions the initial aliquot of the second solution, thereby delivering an increasing concentration gradient of the first solution to the biological material in the well.

Embodiment B53. The method of any one of embodiments B33-B49, further comprising repeating b)-e) by increasing in consecutive introductions the initial aliquot of the second solution and reducing in consecutive introductions the initial aliquot of the first solution, thereby delivering a decreasing concentration gradient of the first solution to the biological material in the well.

Embodiment B54. A method for delivering a solution to a biological material, the method comprising:
  a) loading the biological material to the well of the device of any one of embodiments B1-B32;
  b) introducing into the first channel an initial aliquot of the first solution from a first reservoir for an initial time period at an initial pressure level, thereby introducing the first solution to the biological material in the well;
  c) introducing into the second channel an initial aliquot of the second solution from a second reservoir for an initial time period at an initial pressure level, thereby introducing the second solution to the biological material in the well;
  d) introducing into the first channel a second aliquot of the first solution from the first reservoir for a second time period at a second pressure level, wherein the second aliquot of the first solution is a greater volume than the initial aliquot of the first solution is; and
  e) introducing into the second channel a second aliquot of the second solution from the second reservoir for a second time period at a second pressure level, wherein the second aliquot of the second solution is a lesser volume than the initial aliquot of the second solution is.

What is claimed is:

1. A method for delivering a solution to a biological material, the method comprising:
   a) loading the biological material to a well of a device comprising;
   1) a microfluidic biochip that comprises:
      i) a first channel that comprises:
         a first channel inlet configured to receive a first solution; and
         a first channel outlet connected to a mixing channel and configured to deliver the first solution to the mixing channel;
      ii) a second channel that comprises:
         a second channel inlet configured to receive a second solution; and
         a second channel outlet connected to the mixing channel and configured to deliver the second solution to the mixing channel; and
      iii) the mixing channel that comprises:
         a mixing channel inlet configured to receive the first solution and the second solution and mix the first solution with the second solution, thereby providing a mixture of the first solution and the second solution; and
         a mixing channel outlet configured to deliver the first solution, the second solution, or the mixture of the first solution and the second solution to a well; and
   2) the well that comprises:
      a top opening configured to receive a biological material from outside the device and contain the biological material within the well;
      a well inlet connected to the mixing channel outlet and configured to receive the mixture of the first solution and the second solution from the mixing channel outlet, wherein the well inlet is at a bottom end of the well; and
      a well outlet configured to expel a waste solution from the well, wherein the well outlet is located at a height above the bottom end of the well, wherein the height above the bottom end of the well is greater than a height of the biological material that is received in the well;
   b) introducing into the first channel an initial aliquot of the first solution from a first reservoir for an initial time period at an initial pressure level, thereby introducing the first solution to the biological material in the well;
   c) stopping introduction of the first solution from the first reservoir into the first channel;
   d) introducing into the second channel an initial aliquot of the second solution from a second reservoir for an initial time period at an initial pressure level, thereby introducing the second solution to the biological material in the well; and
   e) stopping the introduction of the second solution from the second reservoir into the second channel,
thereby delivering the solution to the biological material.

2. The method of claim 1, further comprising introducing into the first channel a second aliquot of the first solution from the first reservoir for a second time period at a second pressure level, wherein the second aliquot of the first solution is a greater volume than the initial aliquot of the first solution is.

3. The method of claim 1, further comprising introducing into the first channel a second aliquot of the first solution from the first reservoir for a second time period at a second pressure level, wherein the second aliquot of the first solution is a lesser volume than the initial aliquot of the first solution is.

4. The method of claim 1, further comprising introducing into the first channel a second aliquot of the first solution from the first reservoir for a second time period at a second pressure level, wherein the second time period is greater than the initial time period is.

5. The method of claim 1, further comprising introducing into the first channel a second aliquot of the first solution from the first reservoir for a second time period at a second pressure level, wherein the second time period is lesser than the initial time period is.

6. The method of claim 1, further comprising introducing into the first channel a second aliquot of the first solution from the first reservoir for a second time period at a second pressure level, wherein the second pressure level is greater than the initial pressure level is.

7. The method of claim 1, further comprising introducing into the first channel a second aliquot of the first solution from the first reservoir for a second time period at a second pressure level, wherein the second pressure level is lesser than the initial pressure level is.

8. The method of claim 1, wherein the introduction of the first solution into the first channel is by actuating positive pressure within the first channel.

9. The method of claim 1, wherein the introduction of the second solution into the second channel is by actuating positive pressure within the second channel.

10. The method of claim 1, wherein the method is a cryopreservation procedure, wherein the first solution is a vitrification solution and the second solution is a buffer solution.

11. The method of claim 1, wherein the method is a thawing procedure, wherein the first solution is a buffer solution and the second solution is a revival solution.

12. The method of claim 1, further comprising priming the first channel with the first solution prior to a).

13. The method of claim 1, further comprising priming the second channel with the second solution prior to d).

14. The method of claim 1, further comprising priming the mixing channel with the second solution prior to d).

15. The method of claim 1, further comprising heating the device.

16. The method of claim 1, further comprising removing the biological material from the well after delivering the solution to the biological material.

17. The method of claim 1, further comprising submerging the biological material in liquid nitrogen after delivering the solution to the biological material.

18. The method of claim 1, further comprising repeating b)-e) until the well contains about 100% of the first solution and about 0% of the second solution.

19. The method of claim 1, further comprising repeating b)-e) until the well contains about 0% of the first solution and about 100% of the second solution.

20. The method of claim 1, further comprising repeating b)-e) by increasing in consecutive introductions the initial aliquot of the first solution and reducing in consecutive introductions the initial aliquot of the second solution, thereby delivering an increasing concentration gradient of the first solution to the biological material in the well.

21. The method of claim 1, further comprising repeating b)-e) by increasing in consecutive introductions the initial aliquot of the second solution and reducing in consecutive introductions the initial aliquot of the first solution, thereby delivering a decreasing concentration gradient of the first solution to the biological material in the well.

22. A method for delivering a solution to a biological material, the method comprising:
   a) loading the biological material to a well of a device comprising;
   1) a microfluidic biochip that comprises:
   i) a first channel that comprises:
      a first channel inlet configured to receive a first solution; and
      a first channel outlet connected to a mixing channel and configured to deliver the first solution to the mixing channel;
   ii) a second channel that comprises:
      a second channel inlet configured to receive a second solution; and
      a second channel outlet connected to the mixing channel and configured to deliver the second solution to the mixing channel; and
   iii) the mixing channel that comprises:
      a mixing channel inlet configured to receive the first solution and the second solution and mix the first solution with the second solution, thereby providing a mixture of the first solution and the second solution; and
      a mixing channel outlet configured to deliver the first solution, the second solution, or the mixture of the first solution and the second solution to a well; and
   2) the well that comprises:
      a top opening configured to receive a biological material from outside the device and contain the biological material within the well;
      a well inlet connected to the mixing channel outlet and configured to receive the mixture of the first solution and the second solution from the mixing channel outlet, wherein the well inlet is at a bottom end of the well; and
      a well outlet configured to expel a waste solution from the well, wherein the well outlet is located at a height above the bottom end of the well, wherein the height above the bottom end of the well is greater than a height of the biological material that is received in the well;
   b) introducing into the first channel an initial aliquot of the first solution from a first reservoir for an initial time period at an initial pressure level, thereby introducing the first solution to the biological material in the well;
   c) introducing into the second channel an initial aliquot of the second solution from a second reservoir for an initial time period at an initial pressure level, thereby introducing the second solution to the biological material in the well;
   d) introducing into the first channel a second aliquot of the first solution from the first reservoir for a second time period at a second pressure level, wherein the second aliquot of the first solution is a greater volume than the initial aliquot of the first solution is; and
   e) introducing into the second channel a second aliquot of the second solution from the second reservoir for a second time period at a second pressure level, wherein the second aliquot of the second solution is a lesser volume than the initial aliquot of the second solution is.

* * * * *